United States Patent
Schedivy et al.

(10) Patent No.: US 7,954,894 B2
(45) Date of Patent: Jun. 7, 2011

(54) HEADREST MOUNTABLE VIDEO SYSTEM

(75) Inventors: George C. Schedivy, Aquebogue, NY (US); David M. Shalam, Syosset, NY (US)

(73) Assignee: Audiovox Corporation, Hauppauge, NY (US)

(*) Notice: Subject to any disclaimer, the term of this patent is extended or adjusted under 35 U.S.C. 154(b) by 913 days.

(21) Appl. No.: 11/072,171

(22) Filed: Mar. 4, 2005

(65) Prior Publication Data

US 2005/0200697 A1  Sep. 15, 2005

Related U.S. Application Data

(63) Continuation-in-part of application No. 10/438,724, filed on May 15, 2003, now Pat. No. 7,245,274.

(51) Int. Cl.
*A47C 7/72* (2006.01)
(52) U.S. Cl. .................. 297/217.3; 297/217.1
(58) Field of Classification Search .......... 297/217.3, 297/217.1
See application file for complete search history.

(56) References Cited

U.S. PATENT DOCUMENTS

| | | | |
|---|---|---|---|
| 3,019,050 A | 1/1962 | Spielman | |
| 4,647,980 A * | 3/1987 | Steventon et al. | 348/837 |
| 4,681,366 A | 7/1987 | Lobanoff | 297/191 |
| 4,702,519 A | 10/1987 | Lobanoff | |
| 4,756,528 A | 7/1988 | Umashankar | 273/1 |
| 4,836,478 A | 6/1989 | Sweere | |
| 4,843,477 A | 6/1989 | Mizutani et al. | 358/248 |
| 4,982,996 A | 1/1991 | Vottero-Fin et al. | 297/217.3 |
| 5,021,922 A * | 6/1991 | Davis et al. | 361/679.09 |
| 5,214,514 A | 5/1993 | Haberkern | |
| 5,255,214 A | 10/1993 | Ma | 361/680 |
| 5,267,775 A | 12/1993 | Nguyen | |
| 5,335,076 A | 8/1994 | Reh et al. | |
| 5,396,340 A | 3/1995 | Ishii et al. | |
| 5,410,447 A | 4/1995 | Miyagawa et al. | 361/681 |
| 5,463,688 A | 10/1995 | Wijas | |
| 5,507,556 A | 4/1996 | Dixon | |
| 5,555,466 A | 9/1996 | Scribner et al. | 348/8 |
| 5,610,822 A | 3/1997 | Murphy | |
| 5,667,179 A | 9/1997 | Rosen | |
| 5,793,413 A | 8/1998 | Hylton et al. | |
| 5,796,575 A * | 8/1998 | Podwalny et al. | 361/679.27 |
| 5,842,715 A | 12/1998 | Jones | |

(Continued)

FOREIGN PATENT DOCUMENTS

EP  1550583 A1  7/2005

(Continued)

OTHER PUBLICATIONS

Notice of Allowance and Fee(s) Due from corresponding U.S. Appl. No. 10/438,724, now U.S. Patent No. 7,245,275.

(Continued)

*Primary Examiner* — David Dunn
*Assistant Examiner* — Tania Abraham
(74) *Attorney, Agent, or Firm* — F. Chau & Associates LLC.

(57) ABSTRACT

A media system for a seat in a vehicle comprises a display electrically coupled to a media player, wherein the display and the media player are housed together in a first housing, and a second housing disposed substantially in the seat and adapted to secure the first housing including the display and the media player therein, wherein the first housing is selectively detachable from the second housing.

31 Claims, 26 Drawing Sheets

U.S. PATENT DOCUMENTS

| | | | |
|---|---|---|---|
| 5,949,345 A | 9/1999 | Beckert et al. | 340/815.41 |
| 6,058,288 A | 5/2000 | Reed et al. | |
| 6,081,420 A | 6/2000 | Kim et al. | 361/681 |
| 6,092,705 A | 7/2000 | Meritt | |
| 6,098,705 A | 8/2000 | Kim | |
| 6,102,476 A | 8/2000 | May et al. | 297/217.3 |
| 6,134,223 A | 10/2000 | Burke et al. | |
| D438,853 S | 3/2001 | Lino | D14/136 |
| 6,199,810 B1 | 3/2001 | Wu et al. | |
| 6,216,927 B1 | 4/2001 | Meritt | |
| 6,266,236 B1 | 7/2001 | Ku et al. | 361/681 |
| 6,292,236 B1 | 9/2001 | Rosen | 348/837 |
| 6,300,880 B1 | 10/2001 | Sitnik | |
| 6,301,367 B1 | 10/2001 | Boyden et al. | |
| 6,317,039 B1 | 11/2001 | Thomason | |
| 6,337,913 B1 | 1/2002 | Chang | |
| 6,339,455 B1 | 1/2002 | Allan et al. | |
| 6,380,978 B1 | 4/2002 | Adams et al. | |
| 6,409,242 B1 | 6/2002 | Chang | 296/37.7 |
| 6,419,379 B1 | 7/2002 | Hulse | |
| 6,443,574 B1 | 9/2002 | Howell et al. | |
| 6,587,127 B1 | 7/2003 | Leeke et al. | |
| 6,665,163 B2 | 12/2003 | Yanagisawa | |
| 6,666,492 B1 | 12/2003 | Schmidt et al. | |
| 6,669,285 B1 | 12/2003 | Park et al. | 297/217.3 |
| 6,717,798 B2 | 4/2004 | Bell et al. | |
| 6,719,343 B2 | 4/2004 | Emerling et al. | 296/24.34 |
| 6,724,317 B1 | 4/2004 | Kitano et al. | 340/691.1 |
| 6,739,654 B1 * | 5/2004 | Shen et al. | 297/188.04 |
| 6,754,070 B2 * | 6/2004 | Chen | 361/679.26 |
| 6,754,183 B1 | 6/2004 | Razavi et al. | |
| 6,758,521 B2 | 7/2004 | Imamura et al. | |
| 6,871,356 B2 | 3/2005 | Chang | 725/75 |
| 6,899,365 B2 | 5/2005 | Lavelle et al. | |
| 6,979,038 B1 | 12/2005 | Cho et al. | |
| D515,522 S | 2/2006 | Vitito | D14/126 |
| 7,036,879 B2 * | 5/2006 | Chang | 297/217.3 |
| 7,044,546 B2 | 5/2006 | Chang | 297/217.3 |
| 7,070,237 B2 | 7/2006 | Rochel | |
| 7,084,932 B1 | 8/2006 | Mathias et al. | |
| 7,201,354 B1 * | 4/2007 | Lee | 248/231.9 |
| 7,201,356 B2 * | 4/2007 | Huang | 248/309.1 |
| 7,360,833 B2 | 4/2008 | Vitito | |
| 2001/0001083 A1 | 5/2001 | Helot | 439/131 |
| 2001/0044664 A1 | 11/2001 | Mueller et al. | |
| 2002/0005897 A1 | 1/2002 | Kim | |
| 2002/0024538 A1 | 2/2002 | Bandaru et al. | |
| 2002/0149905 A1 | 10/2002 | Jackson, Jr. | |
| 2002/0159270 A1 | 10/2002 | Lynam et al. | |
| 2002/0186531 A1 | 12/2002 | Pokharna et al. | 361/687 |
| 2003/0021086 A1 | 1/2003 | Landry et al. | 361/683 |
| 2003/0042378 A1 | 3/2003 | Imamura et al. | |
| 2003/0057749 A1 | 3/2003 | Buono | |
| 2003/0111880 A1 | 6/2003 | Lambiaso | |
| 2003/0117728 A1 | 6/2003 | Hutzel et al. | |
| 2003/0128504 A1 | 7/2003 | Enners et al. | |
| 2003/0137584 A1 | 7/2003 | Norvell et al. | 348/61 |
| 2003/0184137 A1 | 10/2003 | Jost | 297/219.1 |
| 2003/0193619 A1 | 10/2003 | Farrand | |
| 2003/0194968 A1 | 10/2003 | Young | |
| 2003/0198008 A1 | 10/2003 | Leapman et al. | 361/681 |
| 2003/0220091 A1 | 11/2003 | Farrand et al. | |
| 2003/0229897 A1 | 12/2003 | Frisco et al. | |
| 2004/0007906 A1 | 1/2004 | Park et al. | |
| 2004/0032541 A1 | 2/2004 | Rochel | |
| 2004/0085485 A1 | 5/2004 | Schedivy | |
| 2004/0130616 A1 * | 7/2004 | Tseng | 348/61 |
| 2004/0224638 A1 | 11/2004 | Fadell et al. | |
| 2004/0227696 A1 | 11/2004 | Schedivy | |
| 2004/0227861 A1 | 11/2004 | Schedivy | |
| 2005/0005298 A1 | 1/2005 | Tranchina | |
| 2005/0052046 A1 | 3/2005 | Lavelle et al. | |
| 2005/0099547 A1 | 5/2005 | Vitito | |
| 2005/0110313 A1 | 5/2005 | Vitito et al. | |
| 2005/0204596 A1 | 9/2005 | Peng | |
| 2005/0239434 A1 | 10/2005 | Marlowe | |
| 2005/0242636 A1 | 11/2005 | Vitito | |
| 2005/0242637 A1 | 11/2005 | Vitito | |
| 2005/0242638 A1 | 11/2005 | Vitito | |
| 2005/0281414 A1 | 12/2005 | Simon et al. | |
| 2006/0047426 A1 | 3/2006 | Vitito | |
| 2006/0098403 A1 | 5/2006 | Smith | |
| 2006/0109388 A1 | 5/2006 | Sanders et al. | |
| 2006/0112144 A1 | 5/2006 | Ireton | |
| 2006/0148575 A1 | 7/2006 | Vitito | |
| 2008/0170165 A1 | 7/2008 | Lee et al. | |

FOREIGN PATENT DOCUMENTS

| | | |
|---|---|---|
| FR | 2817812 | 6/2002 |
| FR | 2 829 980 | 3/2003 |
| JP | 2001-047921 | 2/2001 |
| WO | WO 00/38951 | 7/2000 |
| WO | WO 02/074577 A1 | 9/2002 |
| WO | WO 03/029050 A1 | 4/2003 |

OTHER PUBLICATIONS

Office Action mailed Jan. 10, 2007 from corresponding U.S. Appl. No. 10/438,724, now U.S. Patent No. 7,245,275.

Office Action mailed Jun. 5, 2006 from corresponding U.S. Appl. No. 10/438,724, now U.S. Patent No. 7,245,275.

Office Action mailed Oct. 4, 2005 from corresponding U.S. Appl. No. 10/438,724, now U.S. Patent No. 7,245,275.

European Search Report dated Jun. 15, 2009 which was issued in related European Appln. No. 06837036.0.

Ntc of Allowance and Fees Due dated Apr. 4, 2007 from corresponding U.S. Appl. No. 10/438,724, now U.S. Patent No. 7,245,275.

Ofc Action mailed Jan. 10, 2007 from corresponding U.S. Appl. No. 10/438,724, now U.S. Patent No. 7,245,275.

Ofc Action mailed Jun. 5, 2006 from corresponding U.S. Appl. No. 10/438,724, now U.S. Patent No. 7,245,275.

Ofc Action mailed Oct. 4, 2005 from corresponding U.S. Appl. No. 10/438,724, now U.S. Patent No. 7,245,275.

Ofc Action mailed Jul. 13, 2007 from corresponding U.S. Appl. No. 10/688,611.

Ofc Action mailed Oct. 27, 2006 from corresponding U.S. Appl. No. 10/688,611.

Ofc Action mailed Jun. 16, 2006 from corresponding U.S. Appl. No. 10/688,611.

International Search Report from PCT/US2004/34371.

Ofc Action mailed Sep. 12, 2008 from corresponding U.S. Appl. No. 11/072,171.

Ofc Action mailed Sep. 22, 2008 from corresponding U.S. Appl. No. 10/808,659.

Ofc Action mailed Feb. 26, 2008 from corresponding U.S. Appl. No. 11/072,171.

Ofc Action mailed Aug. 24, 2009 from corresponding U.S. Appl. No. 11/649,121.

Ofc Action mailed Oct. 6, 2009 from corresponding U.S. Appl. No. 11/593,380.

Ofc Action mailed Jun. 22, 2009 from corresponding U.S. Appl. No. 11/557,177.

Office Action dated Mar. 16, 2010 for U.S. Appl. No. 11/649,121.

Office Action dated Jan. 7, 2010 for U.S. Appl. No. 11/557,177.

International Search Report dated Mar. 26, 2010 for European Patent Application No. 07716231.

Volkswagen AG: "Grenzenloser Musikgenuss, Mobiles Klangwunder. Der Golf Und Der Apple Ipod" (XP-002443381) with summary of article No Date.

Supplementary European Search Report dated Oct. 4, 2010 for Application No. EP06827547.

* cited by examiner

HEADREST MOUNTABLE VIDEO SYSTEM

CROSS-REFERENCE TO RELATED APPLICATIONS

This application is a Continuation-In-Part of U.S. application Ser. No. 10/438,724, filed on May 15, 2003 now U.S. Pat. No. 7,245,274. The disclosure of U.S. application Ser. No. 10/438,724 is incorporated herein in its entirety by reference.

1. TECHNICAL FIELD

The present invention relates to a video system, and more particularly to a video system capable of being mounted in a headrest.

2. DISCUSSION OF RELATED ART

As society becomes more mobile and therefore spends a greater amount of time traveling and away from home, demand rises for electronic appliances and devices outside the home environment. For example, as shown in FIGS. 1 and 2, video screens 101 have been mounted in the headrests 102 of vehicles, facilitating video entertainment on the road. These video screens are connected to video players located, for example, in the glove box of the vehicle. However, the video player and video screen cannot be removed from the vehicle. Thus, videos may only be viewed with such systems when occupying the vehicle. Additionally, there is a risk of theft of the video screen and video player and corresponding damage to the vehicle when the vehicle is unattended. Also, it is difficult to service an inoperable video system when the system remains mounted to the headrest.

Therefore, a need exists for a video system which is easily removable from a headrest.

SUMMARY OF THE INVENTION

In one embodiment of the present invention, a media system for a seat in a vehicle comprises a display electrically coupled to a media player, wherein the display and the media player are housed together in a first housing, and a second housing disposed substantially in the seat and adapted to secure the first housing including the display and the media player therein, wherein the first housing is selectively detachable from the second housing.

In another embodiment of the present invention, a media system for a seat in a vehicle comprises a display electrically coupled to a media player, wherein the display and the media player are housed together in a first housing, and a second housing disposed substantially in the seat and adapted to secure the first housing including the display and the media player therein, wherein the first housing is pivotally attached to the second housing using a tilt mechanism, wherein the first housing is capable of pivoting in an angle range of about 0° to about 120° with respect to the second housing.

In another embodiment of the present invention, a method of removing a media system from a seat of a vehicle comprises pivoting a first housing against a second housing for exposing a portion of the second housing, wherein the first housing is pivotally attached to the second housing and the second housing is attached to the seat, removing a fixing device from the exposed portion of the second housing, wherein the fixing device attaches the second housing to the seat, and detaching the second housing, including the first housing pivotally attached thereto, from the seat.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

According to an embodiment of the present invention, a portable video system can be coupled to a vehicle headrest. The portable video system receives a data media comprising data to be displayed. The video system is secured to a docking station mounted in the headrest. The video system is removable, such that the video system can be disconnected from the docking station.

Figure 1:
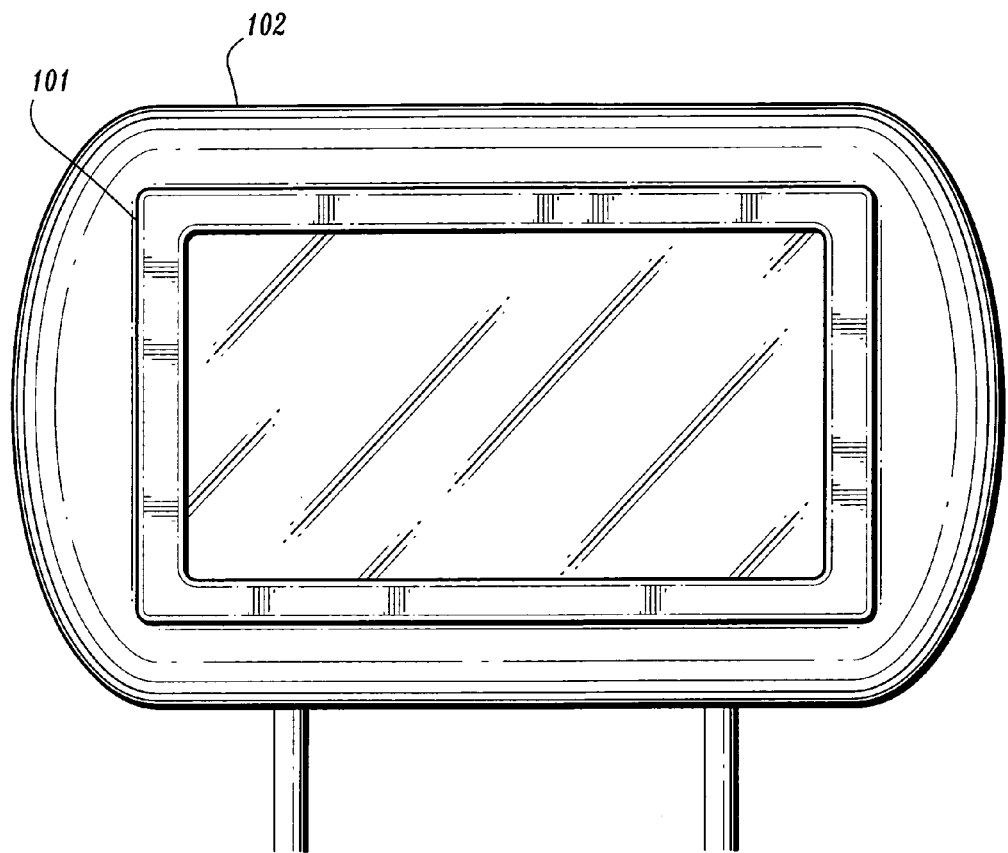
FIG. 1 is an illustration of a video screen installed in a vehicle headrest.
Figure 2:
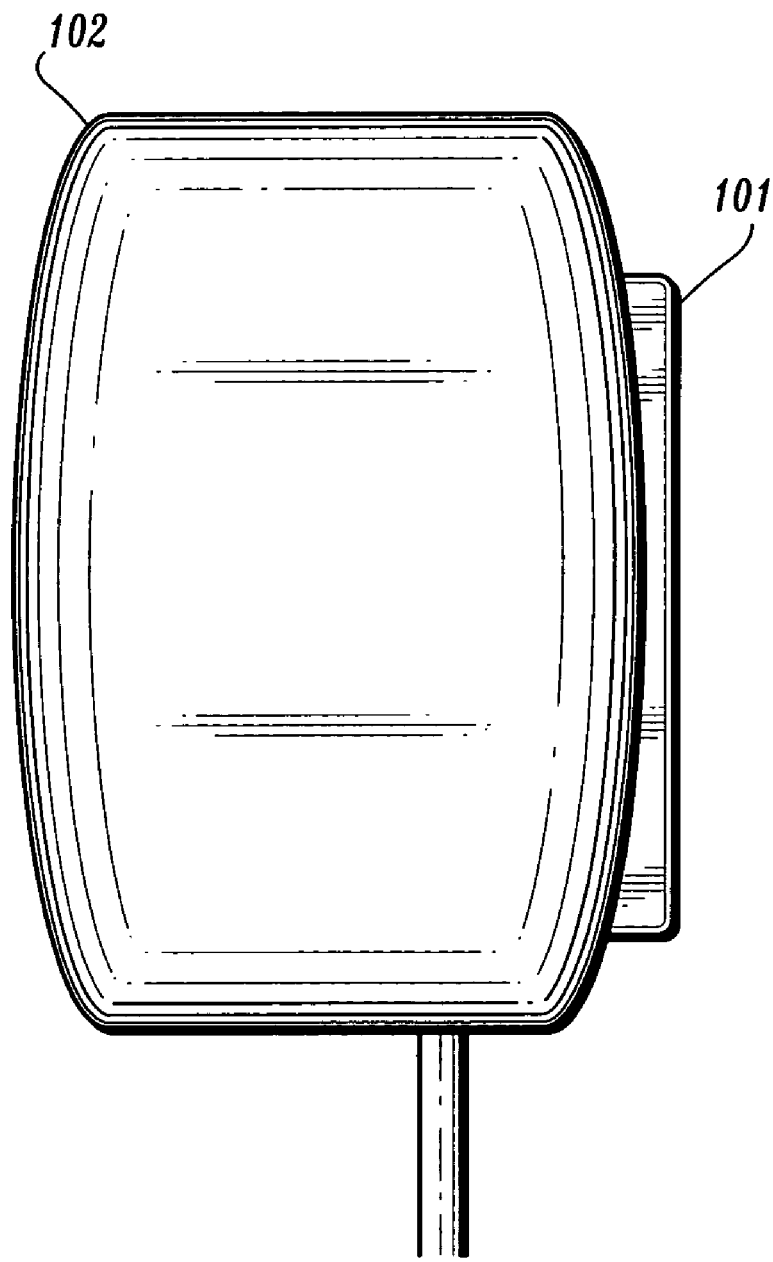
FIG. 2 is an illustration of a video screen installed in a vehicle headrest.
Figure 3A:
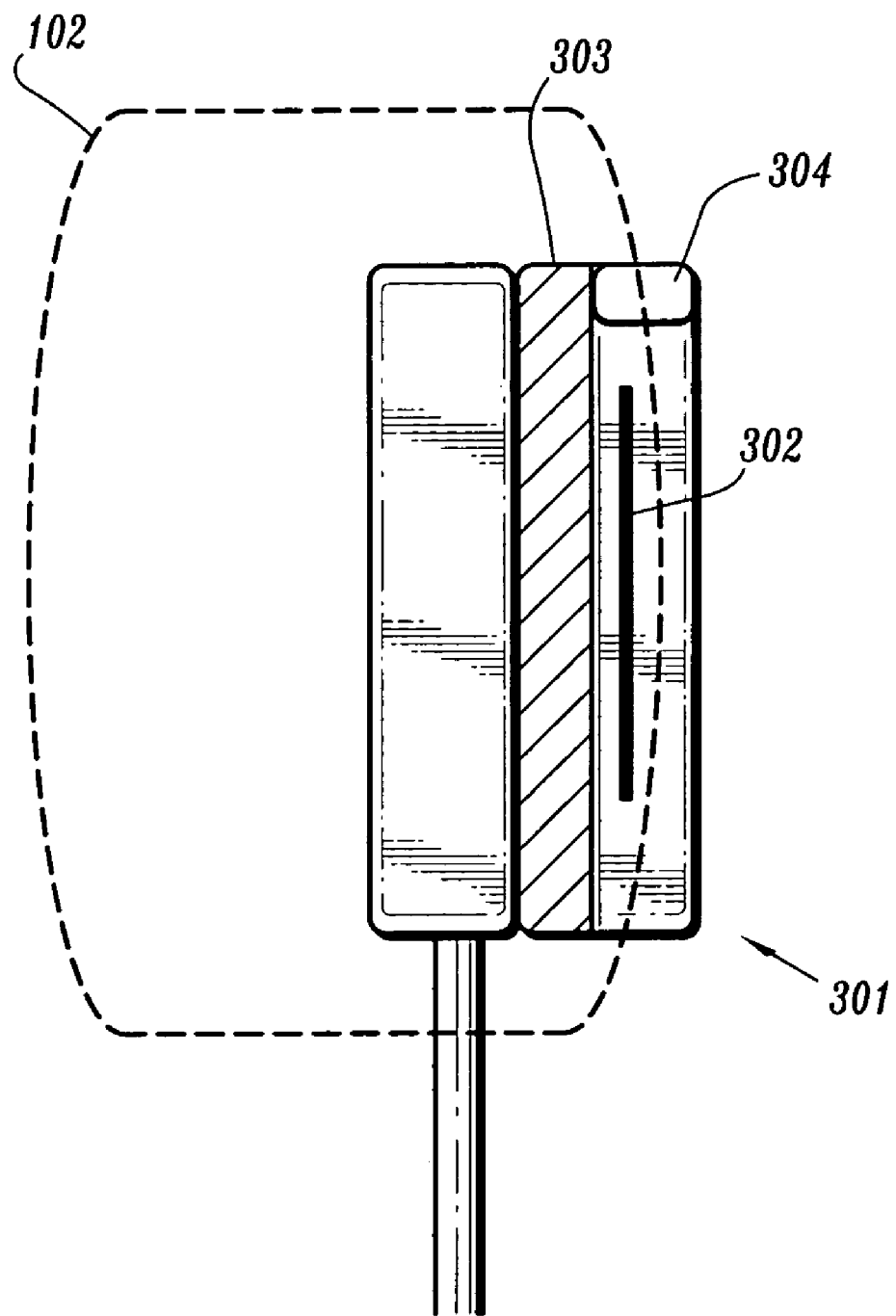
FIG. 3A is an illustration of a side view of a video system and docking station according to an embodiment of the present invention.

Referring to FIG. 3A, the portable video system can be embodied as a slot-type video system 301 comprising a slot 302 that receives a data media into a mechanism for accessing data stored on the medium, such as a digital videodisk (DVD) player, MPEG layer 3 (MP3) disk, or video game disk. The video system 301 is secured to a docking station 303. The video system 301 comprises a hinge 304. The hinge connects a video screen portion of the video system to a base portion of the video system.

Figure 3B:
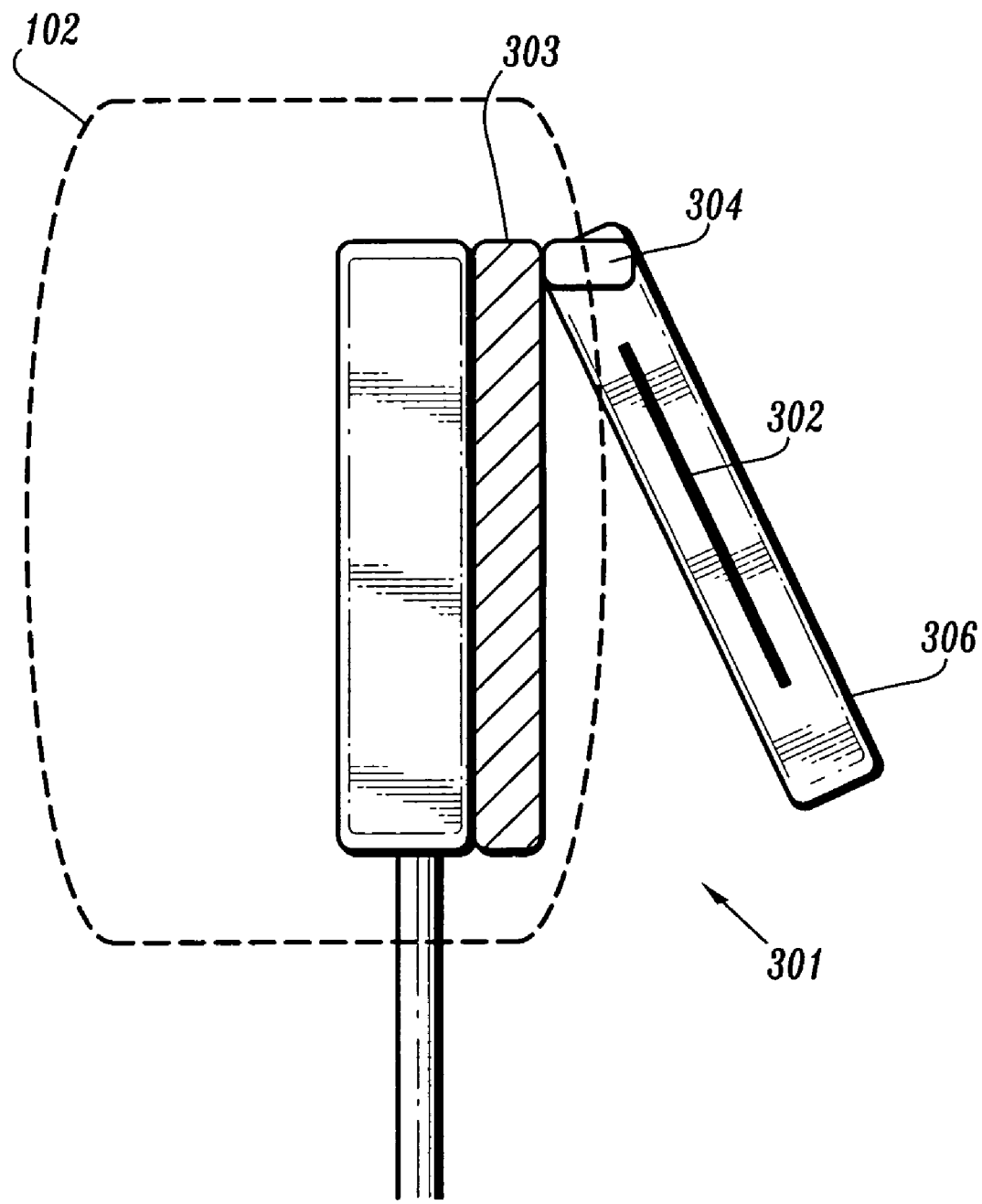
FIG. 3B is an illustration of a side view of a video system and docking station according to an embodiment of the present invention.
Figure 4A:
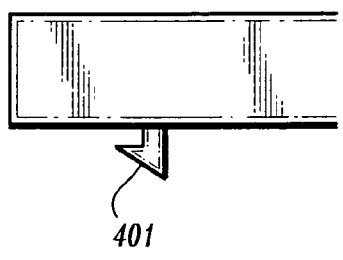
FIGS. 4A and 4B are illustrations of a docking station according to an embodiment of the present invention.
Figure 4B:
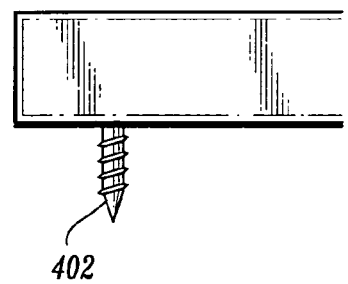
Figure 5A:
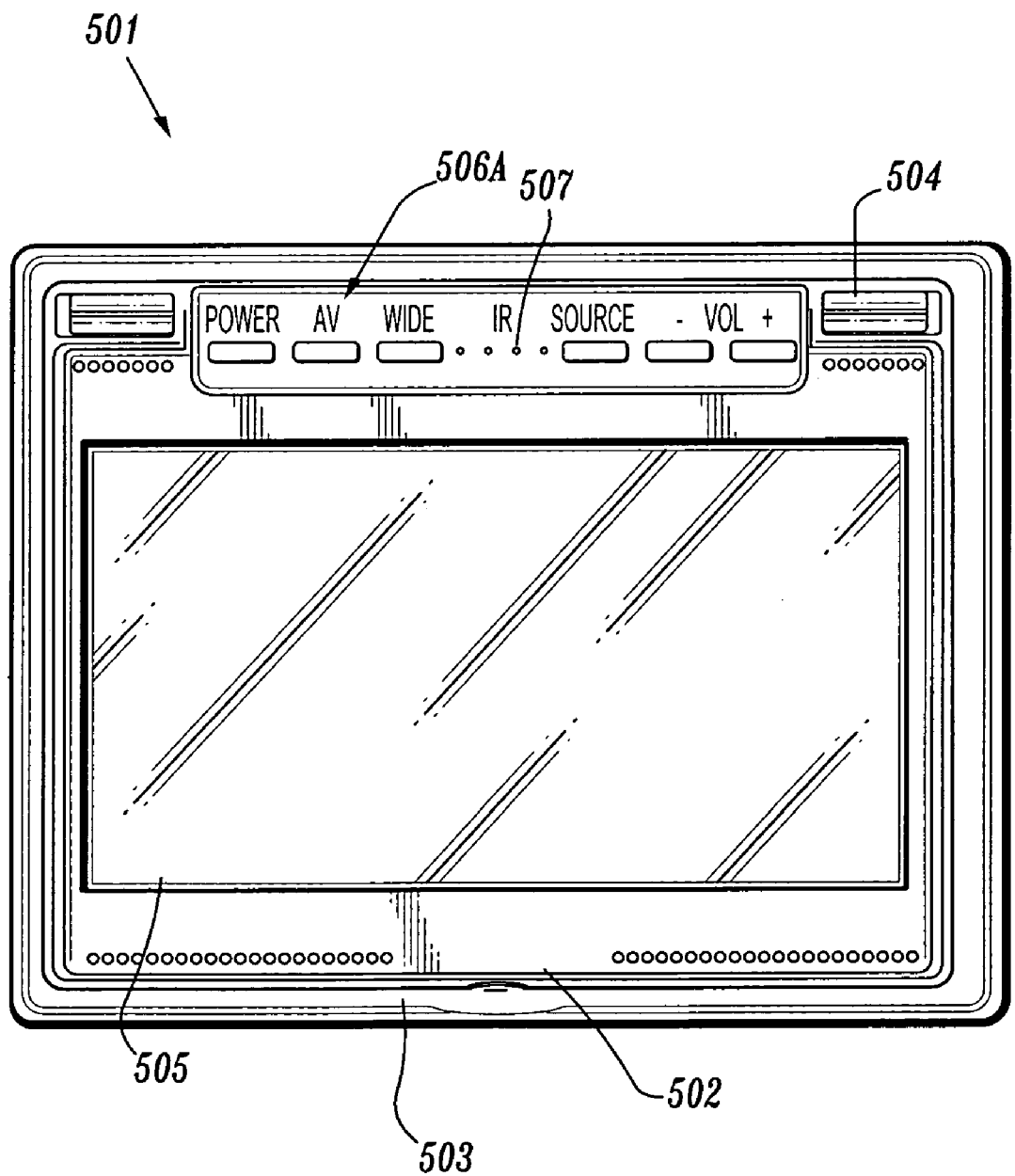
FIG. 5A is an illustration of a front view of a clamshell-type video system according to an embodiment of the present invention.
Figure 5B:
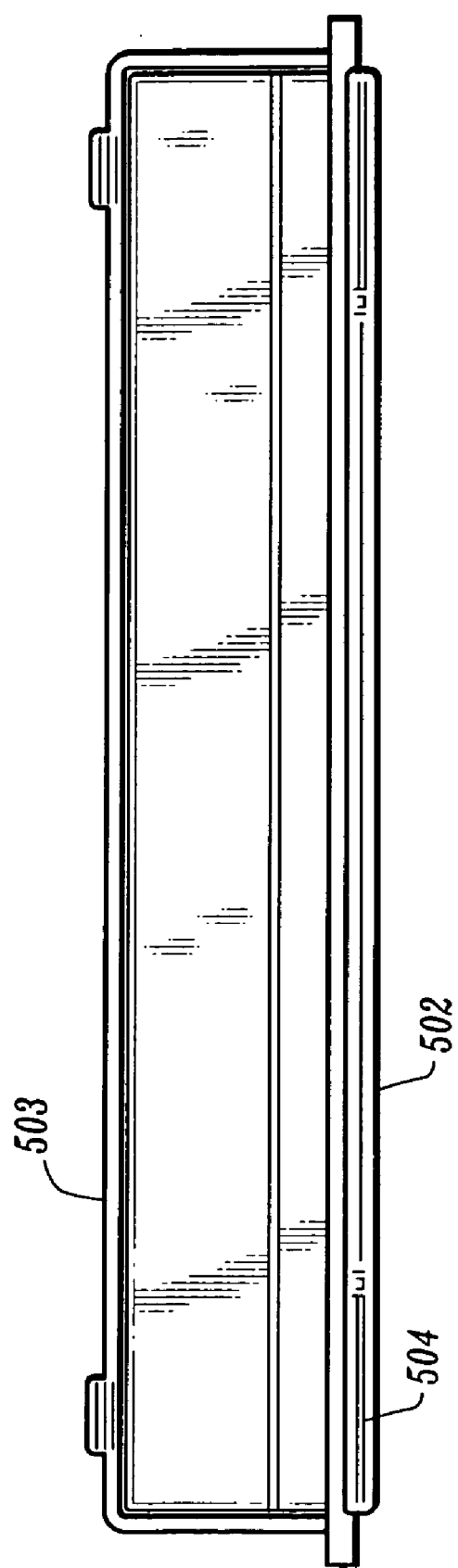
FIG. 5B is an illustration of a top view of a clamshell-type video system according to an embodiment of the present invention.
Figure 5C:
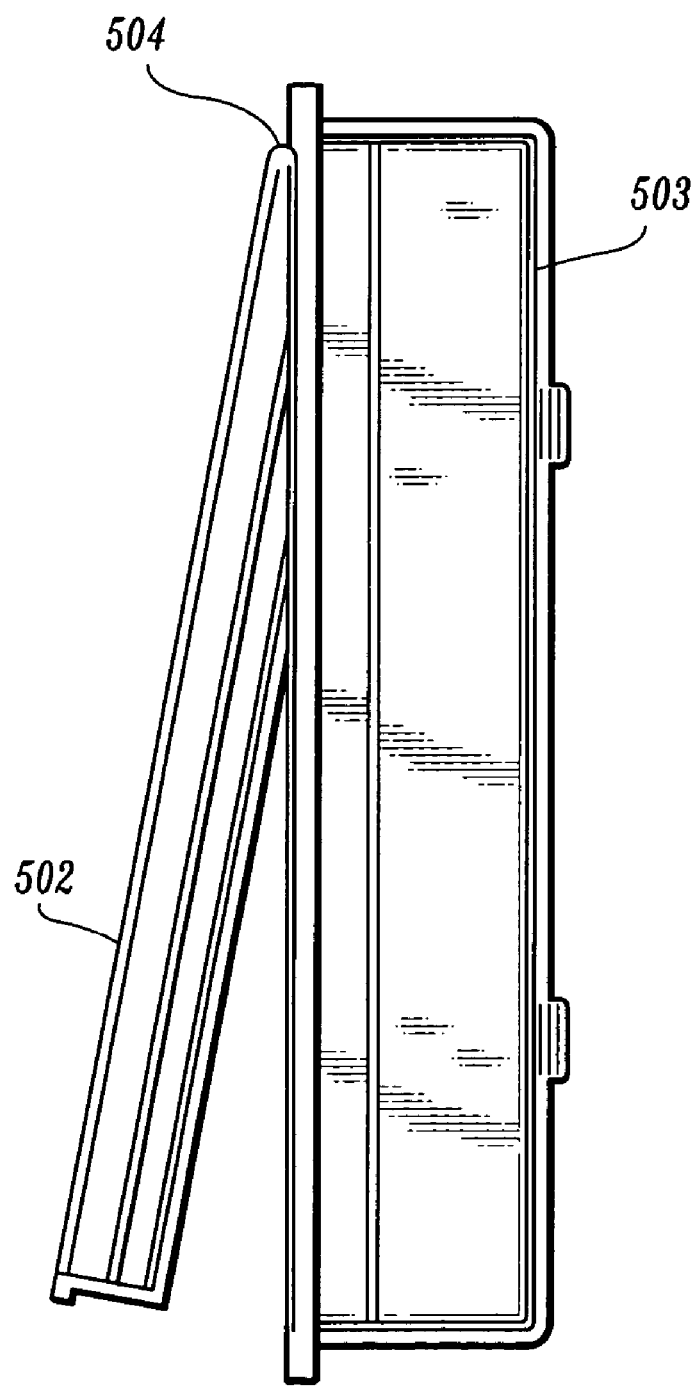
FIG. 5C is an illustration of a side view of a clamshell-type video system according to an embodiment of the present invention.
Figure 5D:
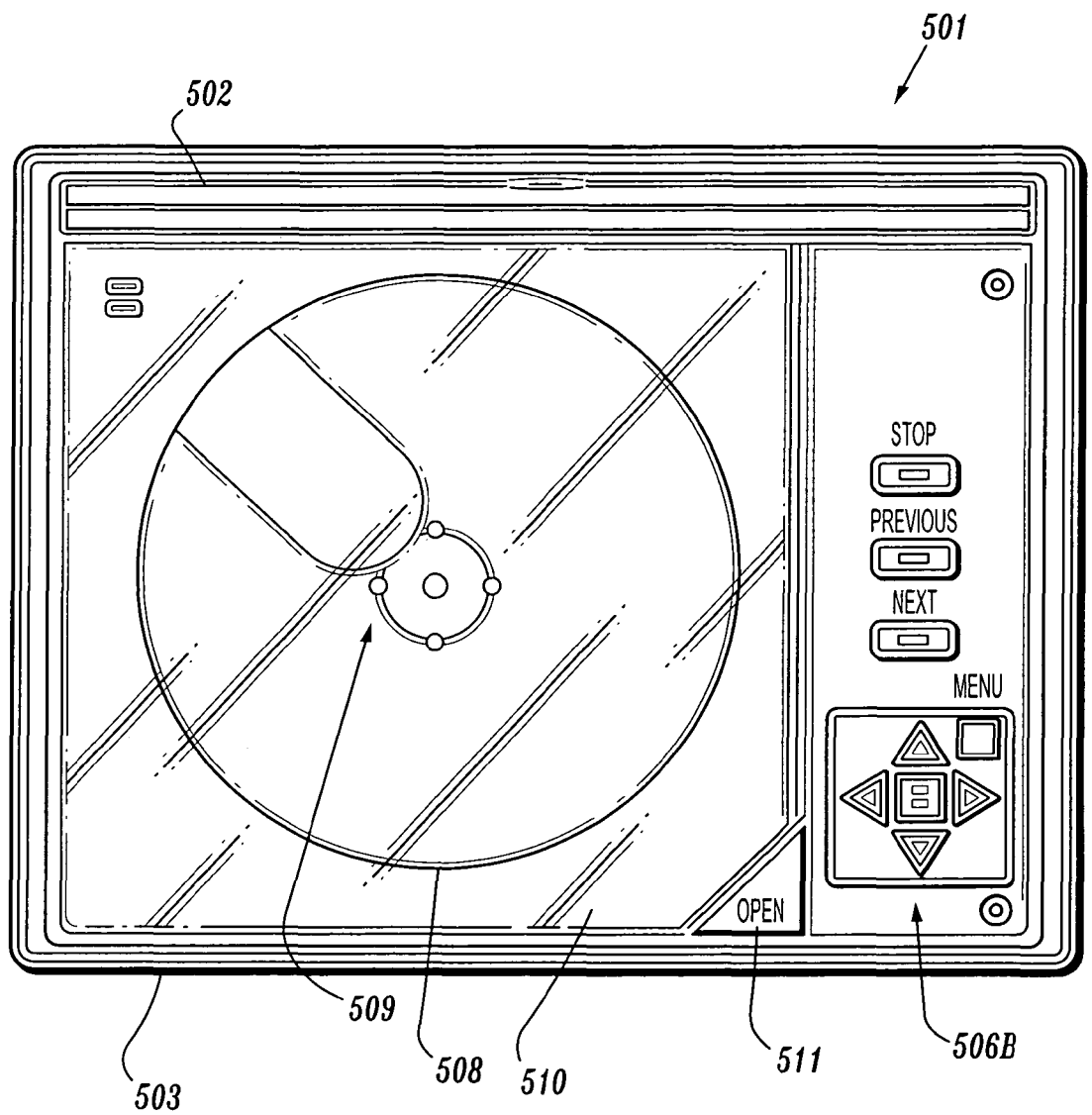
FIG. 5D is an illustration of a front view of a clamshell-type video system in an open position according to an embodiment of the present invention.

As shown in FIG. 3B, the docking station 303 is secured in the headrest 102, and more particularly to an internal headrest support structure 305. The docking station 303 can be secured by, for example, a catch 401 as shown in FIG. 4A and/or a screw 402 as shown in FIG. 4B. One of ordinary skill in the art would recognize that other means of securing the docking station can be used, for example, an adhesive compound. The docking station 303 secures a base portion of the video system 301, and allows a video screen portion 306 to pivot away from the base portion. In a slot-type device, as shown in FIG. 3B, the slot 302 is exposed for receiving a data media when the video screen portion 306 is in a pivoted position away from the base portion of the video system 301.

Figure 3C:
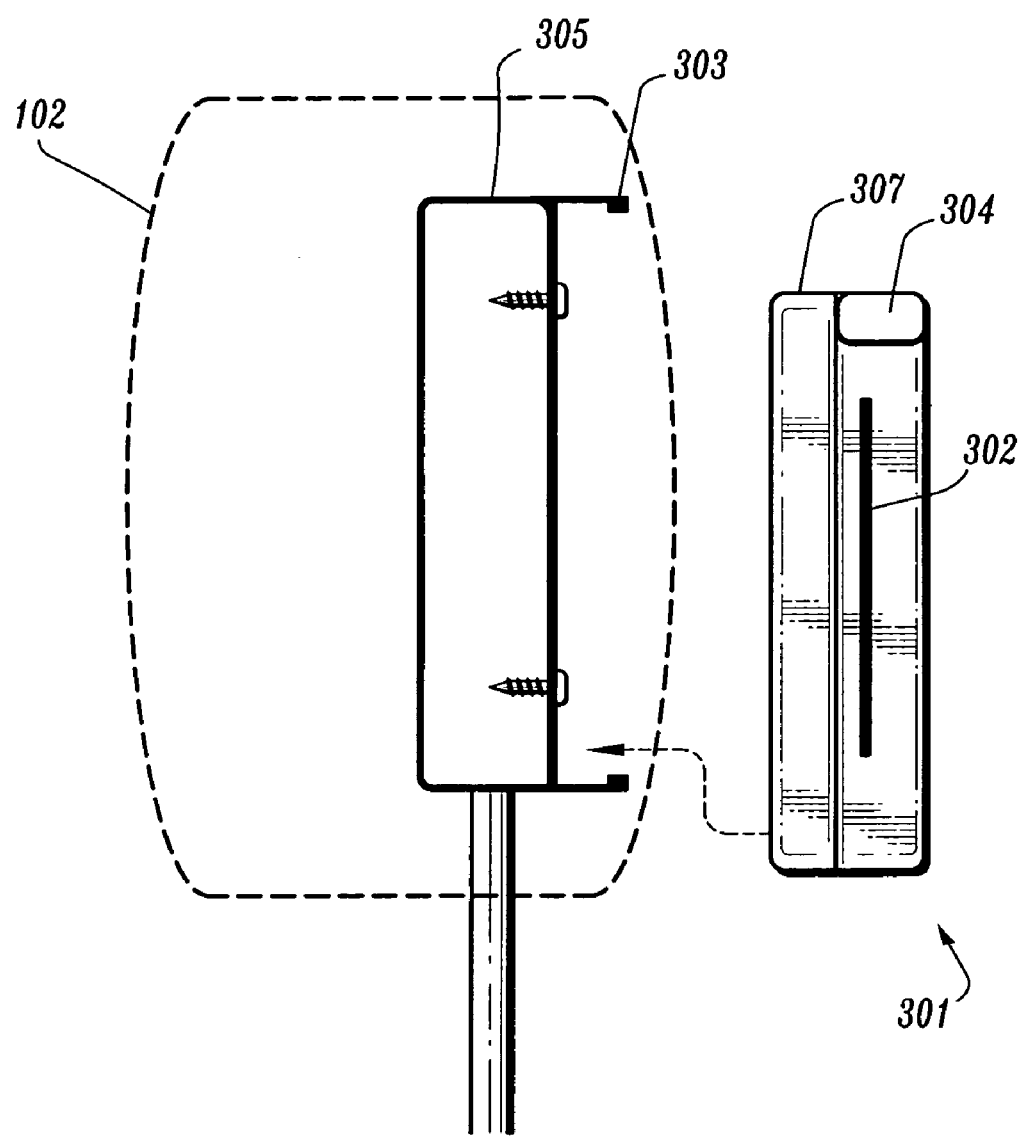
FIG. 3C is an illustration of a side view of an undocking stationed video system according to an embodiment of the present invention.

As shown in FIG. 3C, the video system 301 can be disconnected from the docking station 303 (cut away view). The video system 301 can be operated autonomously. That is, when decoupled from the docking station 303, the video system 301 can access a data media to play, for example, a movie. When disconnected from the docking station, the video system can operate on power supplied by an optional battery or a connection to an external power supply, such as an AC or DC current. The connection can be to the base portion 307 of the video system 301.

Figure 3D:
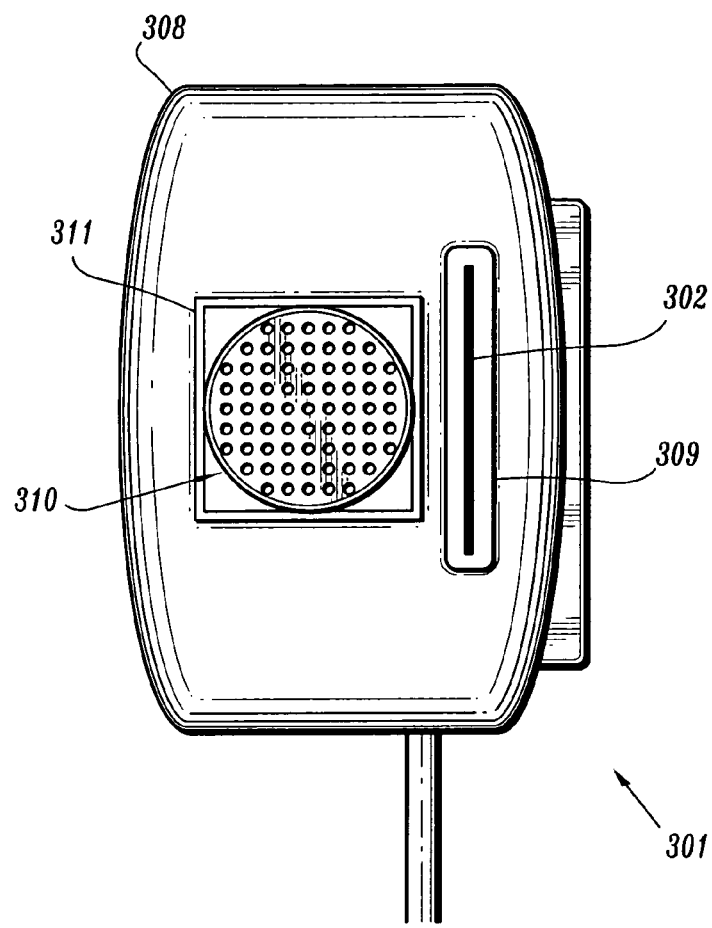
FIG. 3D is an illustration of a side view of a video system according to an embodiment of the present invention

Referring to FIG. 3D, a headrest 308 can comprise an opening 309 for receiving a data media into the video system 301. The video system 301 can be a permanently installed or portable video system. The headrest opening 309 aligns with the slot 302 of the video system 301 to allow data media, such as a DVD or MP3 disk to be inserted from the side, top, or bottom of the headrest 308. The headrest 308 further comprises vents 310 for dissipating heat. A cooling fan 311 for increasing airflow can also be added within the headrest. The cooling fan 311 can be located in the headrest 308 and behind the vent 310, such that the cooling fan 311 is concealed.

Referring to FIGS. 5A through 5D, a portable video system 501 of a clamshell-type is secured to a docking station. The portable video system 501 comprises a door 502 and a base portion 503 connected by a hinge 504. The door 502 pivots away from the base portion 503 on the hinge 504. The hinge 504 can be positioned on any side of the door 502. The door 502 comprises a video screen 505, controls 506A, and an infrared (IR) transmitter and/or receiver 507. The video system 501 receives a data media 508 comprising data to be accessed. When the door 502 is closed the data media 505 is secured. The door 502 can be opened by, for example, depressing a button releasing the door 503 from the base portion 503 or pulling the door 502 away from the base 503 wherein the hinge 504 is a friction fitting. A media player 509 is concealed by cover 510. The cover 510 can be opened by, for example, depressing a button 511. The video system 501 is removable, such that the video system can be disconnected from the docking station 303.

The base 503 comprises a control panel 506B. The control panel 506B comprises a plurality of controls for controlling the functions of the media player, for example, volume control, previous, next, pause, eject and play, and a power on/off button. The controls 506A and 506B can be, for example, buttons, switches, a touch sensitive liquid crystal display, and the like.

Figure 6A:
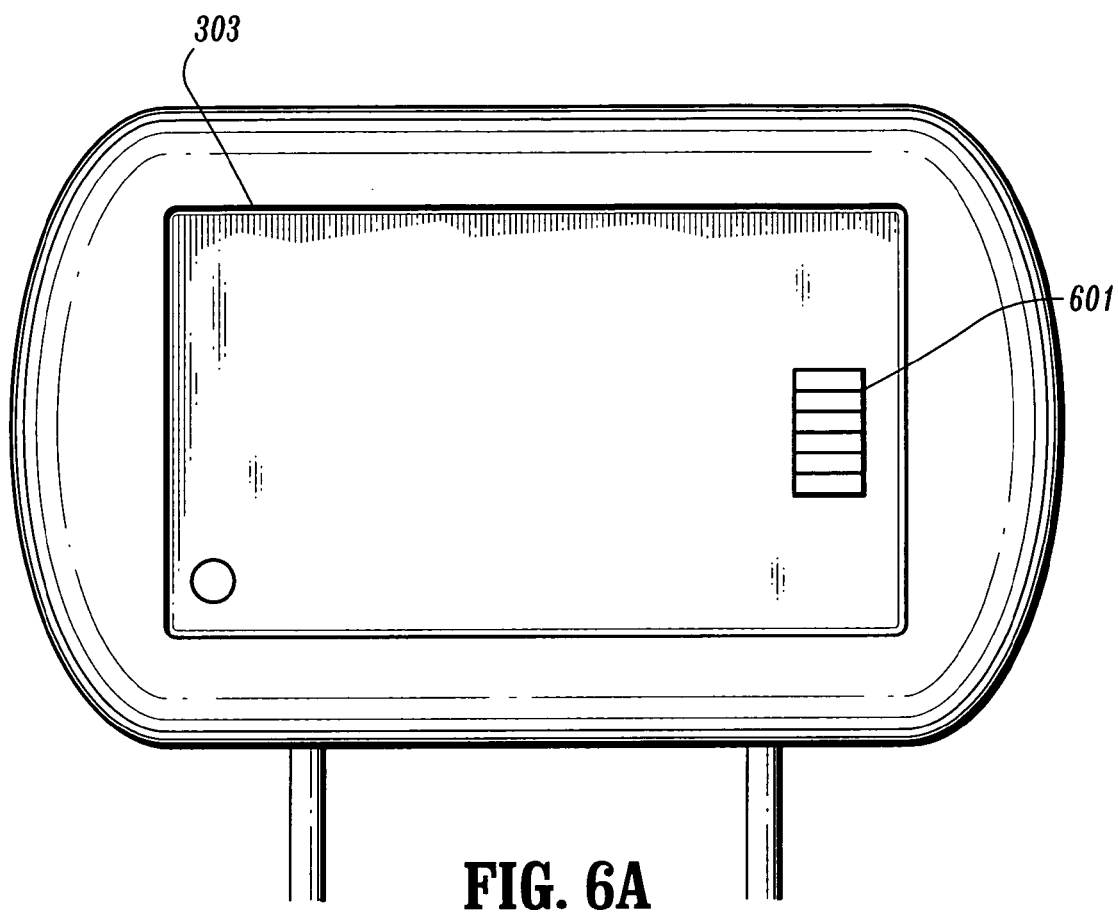
FIG. 6A is an illustration of a docking station according to an embodiment of the present invention.
Figure 6B:
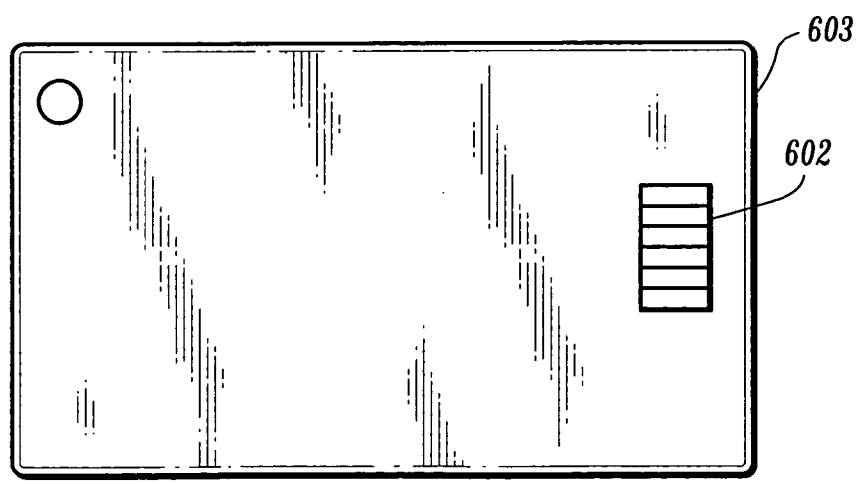
FIG. 6B is an illustration of a rear view of a video system according to an embodiment of the present invention.

Referring now to FIGS. 6A and 6B, the docking station 303 comprises a pin array 601 for connecting to a pin array 602 of a video system 603. The video system 603 can be a slot-type device, a clamshell-type device, or any other device that is capable of being secured in the docking station 303. When the video system 603 is secured to the docking station 303, the pin array 601 and video system pin array 602 transfer data to and from the video player 603. Thus, the video player can be connected to external devices through the docking station 303. The external devices include, for example, a slave video display unit installed in another headrest, a security system, and a vehicle sound system. Where the video system 603 is permanently installed in the headrest, the docking station can be omitted, and a connection to the vehicle's power supply and/or data bus can be directly coupled to the video system 603 through, for example, an electrical harness.

The docking station 303 is coupled to a vehicle's electrical system. The docking station 303 is connected to a vehicle's power supply, e.g., 12 Volts, through a wiring harness. Power can be supplied to the video system 603 through the pin arrays 601 and 602. The docking station 303 can be connected to a vehicle's data communication bus. The data communications bus can carry data to and from the external devices.

Figure 7A:
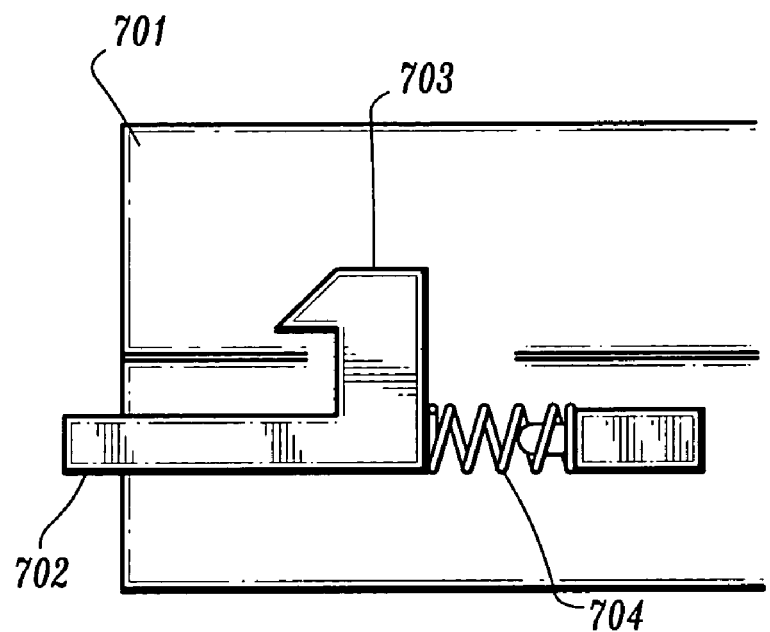
FIGS. 7A, 7B, 7C, 7D, 7E and 7F are illustrations of mechanisms for coupling a video system and a docking station according to an embodiment of the present invention.
Figure 7B:
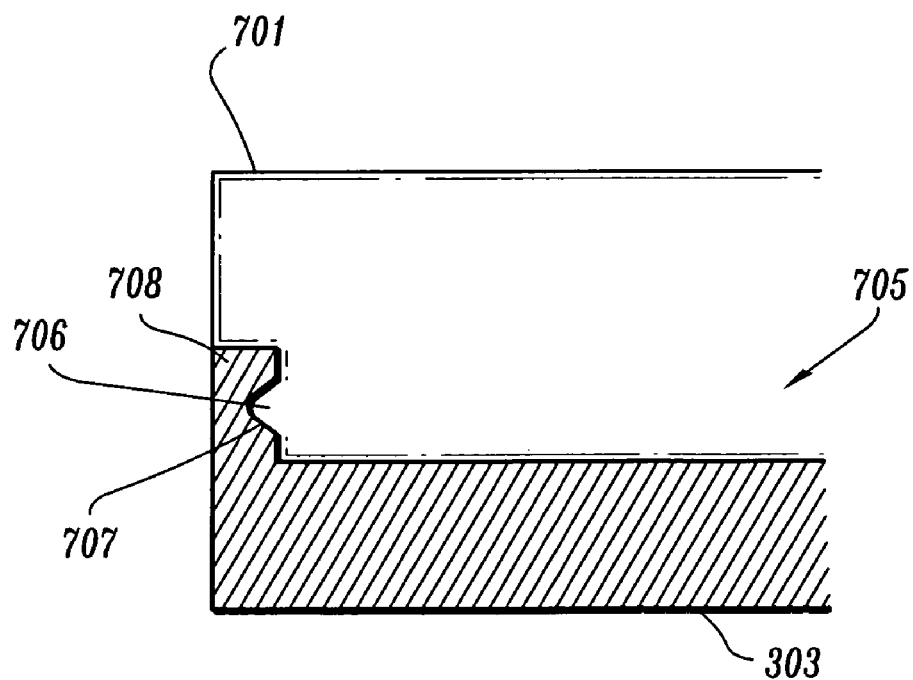

Referring to FIG. 7A, the docking station 303 comprises a quick release mechanism for securing and releasing the video system 701. The quick release mechanism can include a button 702 for releasing a latch 703, which is secured to the video system 701 by pressing the video system 701 securely into the docking station 303. A latch mechanism comprises a latch 703 that passes into a bottom portion of the video system 701. The latch 703 is momentarily displaced as the video system 701 is coupled with the docking station 303. A spring 704 secures the latch 703 in the bottom portion of the video system 701. The button 702 can be pressed, aligning the latch 703 with an opening in the bottom portion of the video system 701, and the video system 701 can be pulled away from the docking station 303. As shown in FIG. 7B, a rear portion 705 of the video system 701 can be secured by a convex portion 706 that fits within a concave portion 707 in the docking station 303. As the video system 701 is pressed into the docking station 303, a wall of the docking station 708 flexes away from the rear portion of the video player until the convex portion 706 is aligned with the concave portion 707. The convex portion 706 and the concave portion 707 cooperate to secure the video system 701 to the docking station 303. Thus, a wall of the docking station 708 can be formed of, for example, a flexible thermoplastic rubber. Other means of securing the video system 701 to the docking station 303 are contemplated, such as, snaps, locks, latches, and the like.

Figure 8:
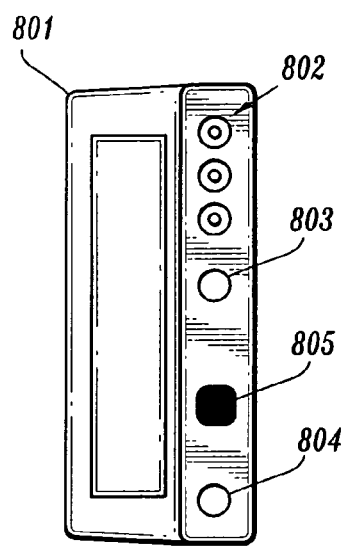
FIG. 8 is an illustration of a video system according to an embodiment of the present invention.

Referring to FIG. 8, the video system 801 comprises input and output ports. For example, audio/video input/output ports 802, a headphone port 803, and a power port 804. It should be understood that other port types can be provided, for example, a USB port or RCA jack for connecting to a game controller. Further, the video system 801 comprises a wireless transmitter for transmitting, for example, an audio radio frequency, Bluetooth®, or Whitefire® signal to wireless headphones. The video system 801 further comprises an infrared (IR) port 805 for transmitting and/or receiving, for example, remote control signals. The ports can be positioned at any convenient location on the video system 801, for example, on a bottom portion of the base of the video system, a front portion of the base of the video system, or a side portion.

Figure 9:
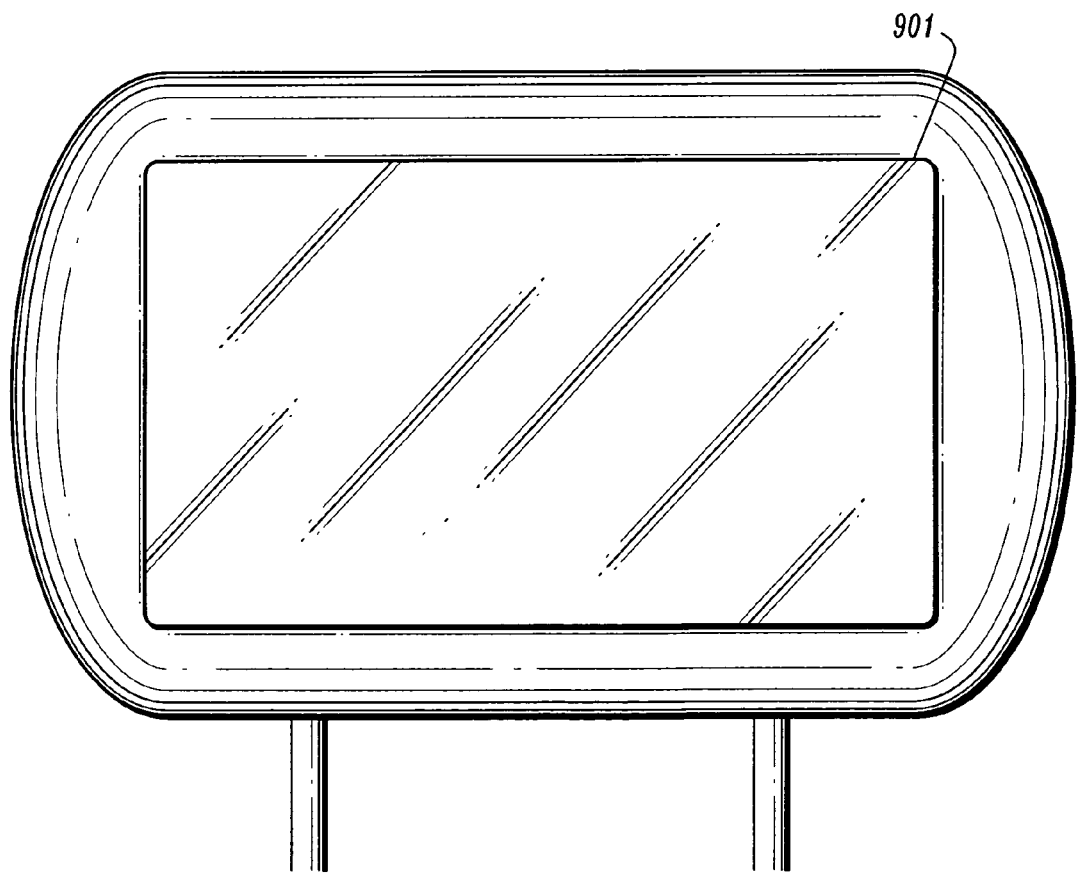
FIG. 9 is an illustration of a docking station cover according to an embodiment of the present invention.

When the video system is removed from the docking station 303, a cover 901 can conceal a portion of the docking station, as shown in FIG. 9. The cover 901 is manufactured from a material such as, plastic, wood, leather, and/or aluminum. The cover 901 can be secured by the same mechanisms as the video system, such as those shown in FIGS. 7A and 7B. Thus, the cover 901 and the video player can have one or more features in common, such as openings for receiving latches and the like.

It is to be appreciated that a portable video system according to the present invention is easily removable from and can be operated outside of a vehicle, for example, in home or office environments. Further, the video system can be permanently connected to the headrest support structure by, for example, screws, catches, and adhesives.

Figure 10:
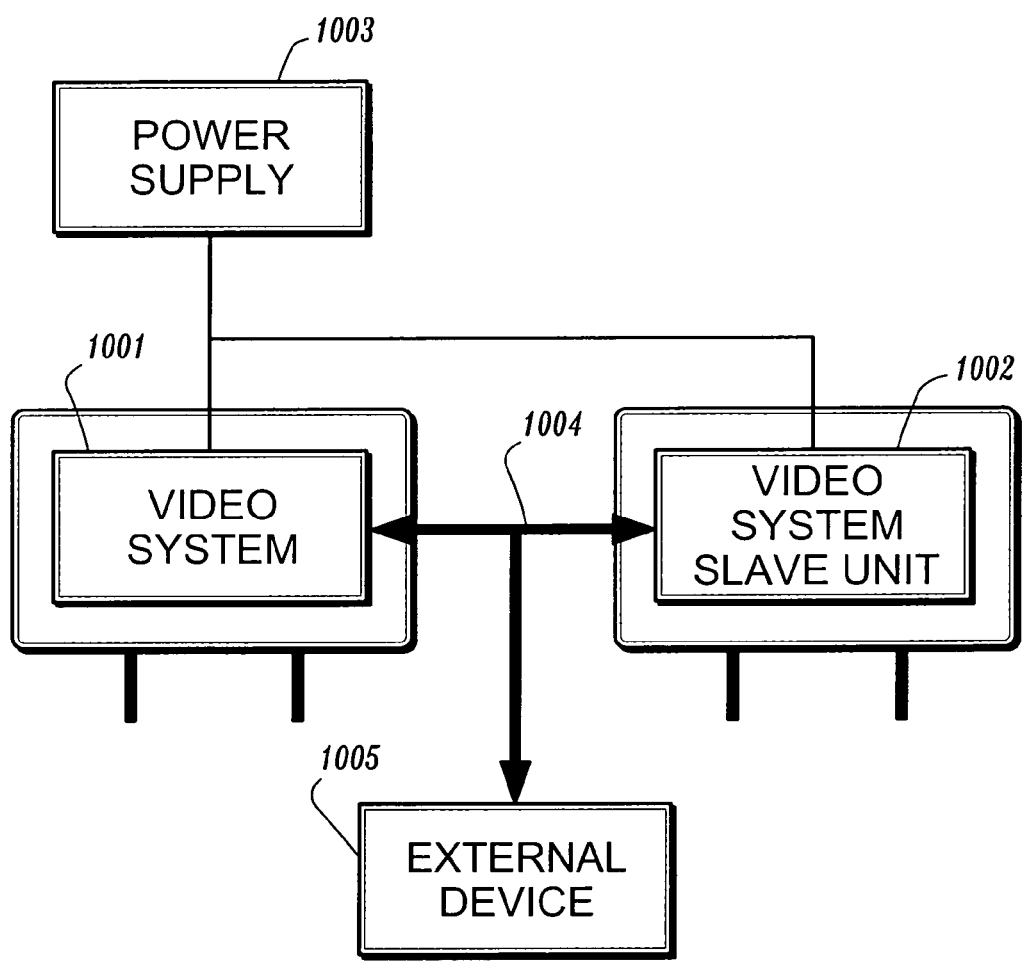
FIG. 10 is a diagram of a system according to an embodiment of the present invention.

Referring now to FIG. 10, a video system 1001 and a video slave unit 1002 are connected to a power supply 1003. The video slave unit receives data to be displayed from the video system 1001 through a data bus 1004. The data bus 1004 can be connected to other devices 1005, such as a vehicle's sound system or a vehicle's navigation system. The connections between the video system 1001 and the external device 1005 can be a wireless connection (not shown). Similarly, the connection between the video system 1001 and the video system slave device 1002 can be a wireless connection (not shown).

Figure 11A:
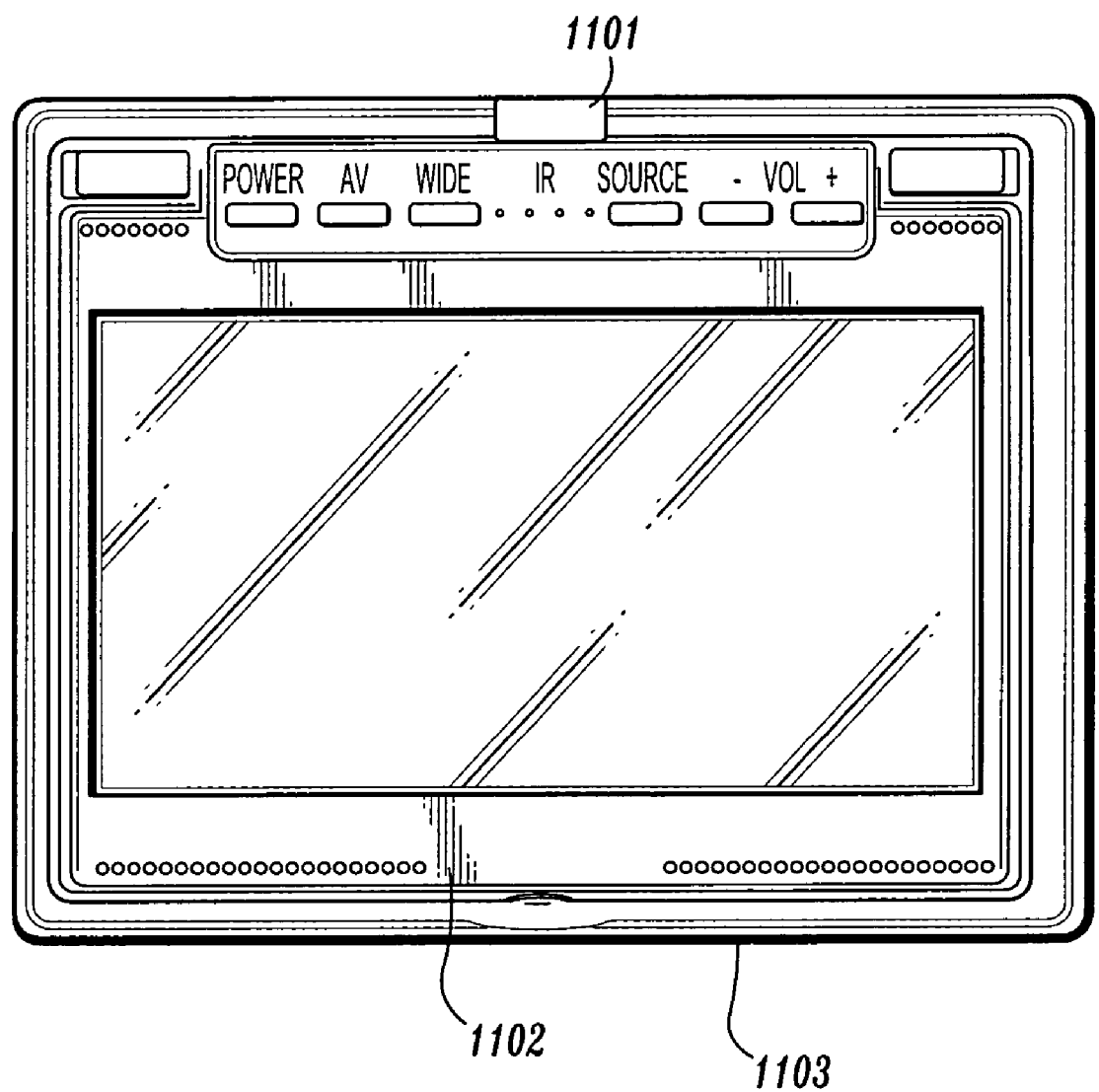
FIGS. 11A and 11B are illustrations of a video system according to an embodiment of the present invention.
Figure 11B:
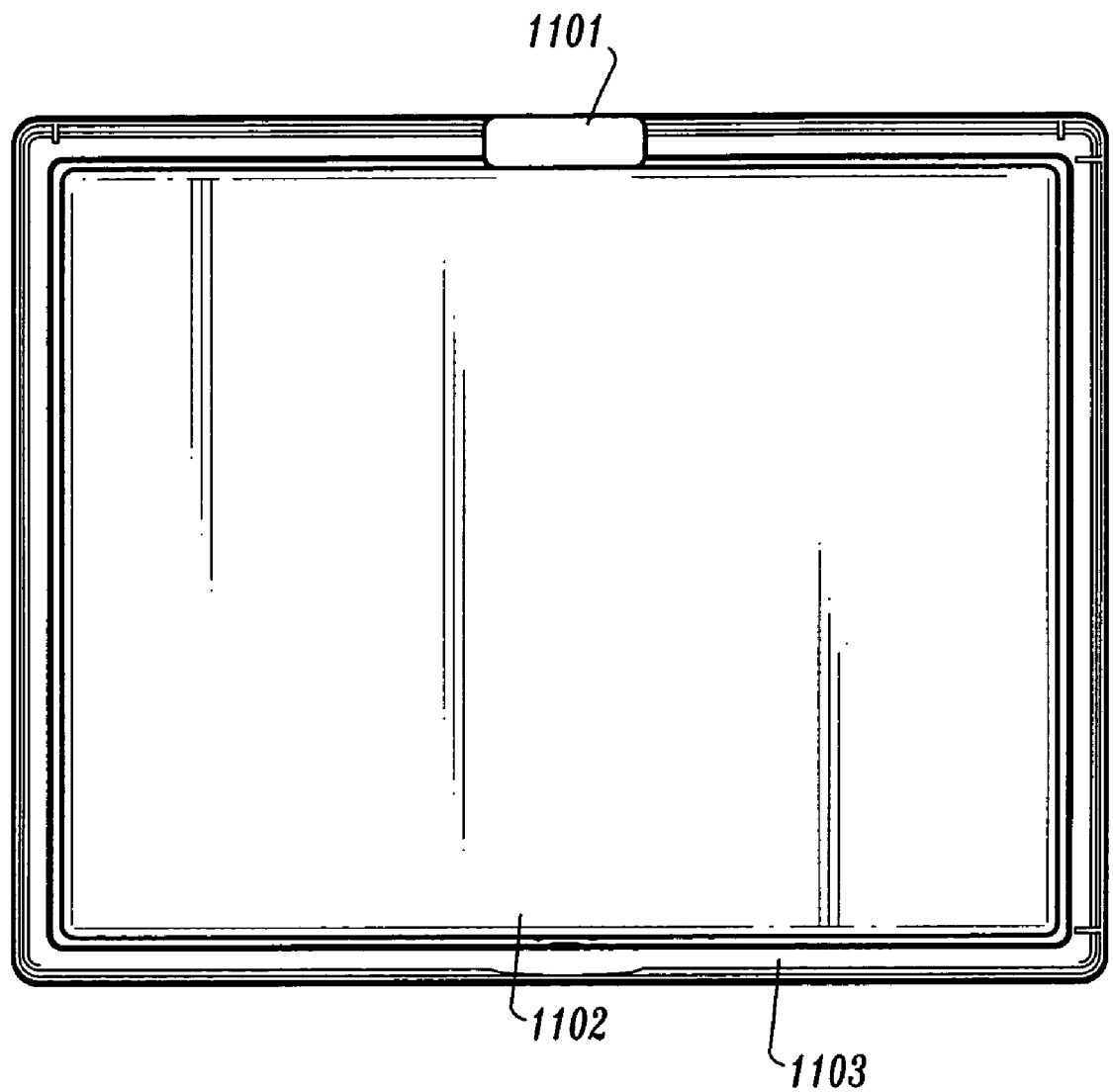

While the video system has been described in terms of a clamshell-type device and a slot-type device, the video system can be embodied in other configurations, for example, as a draw-type device comprising a draw and a spindle for securing the data media in place. Another example of a video system according to an embodiment of the present invention is a tablet-type device comprising a swivel-hinge connecting a video screen to a base portion as shown in FIGS. 11A and 11B. The swivel-hinge 1101 allows a door 1102 comprising a screen to move about two axes such that the screen 1102 can be swiveled about the swivel-hinge 1001 while in an open position, pivoted away from the base 1103. The screen can be turned to face the base portion 1103 when in a fully closed position (e.g., FIG. 11B) or turned to face away from the base portion 1103 in a closed viewing position (e.g., 11A). In both the fully closed position and the closed viewing position, the door 1102 is substantially parallel to the base portion 1103. The swivel-hinge 1101 can be implemented in a slot-type device or a clamshell-type device.

Figure 12A:
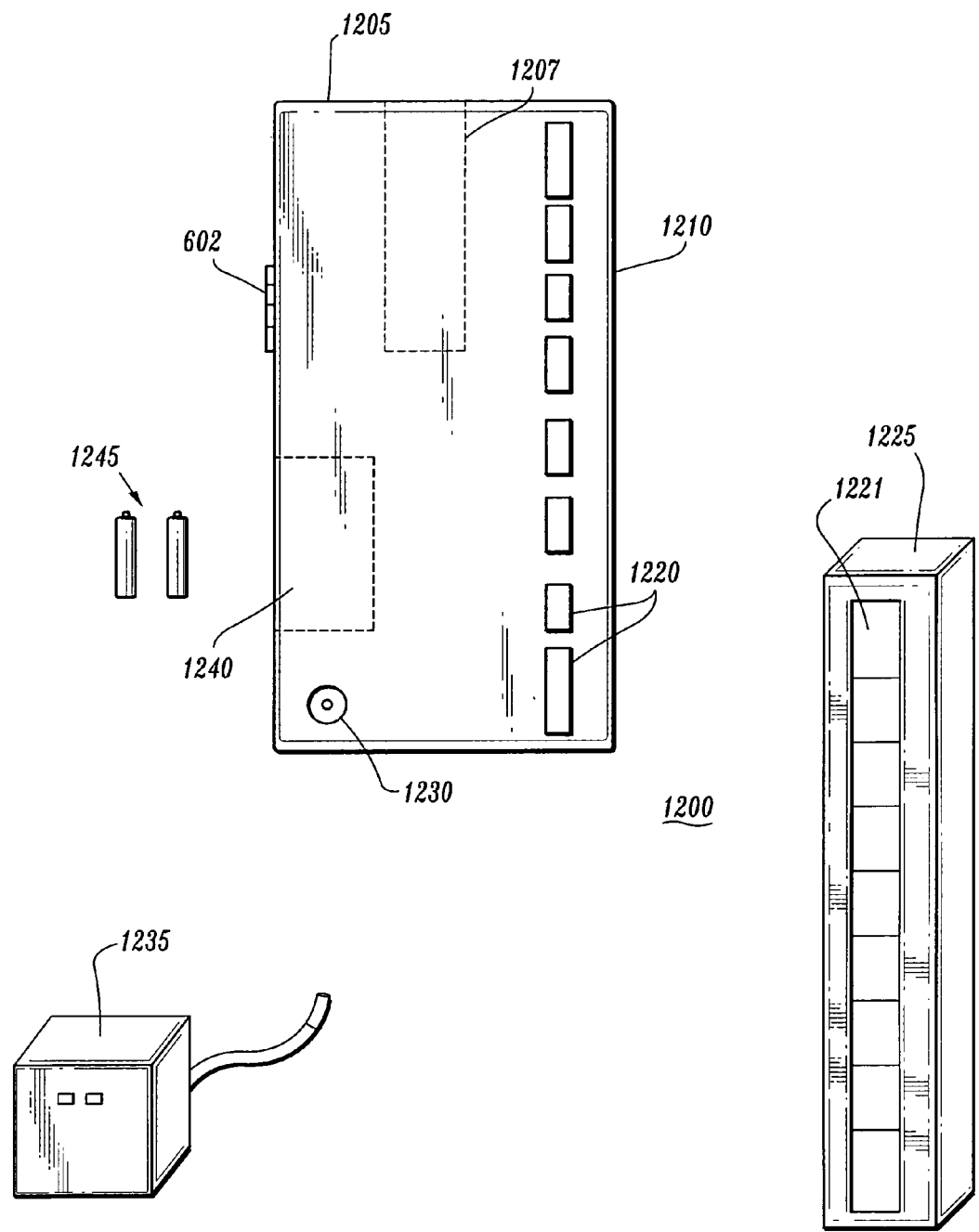
FIGS. 12A, 12B and 12C are illustrations of a side view, a top view and a front view of a video system, respectively, according to an embodiment of the present invention.
Figure 12B:
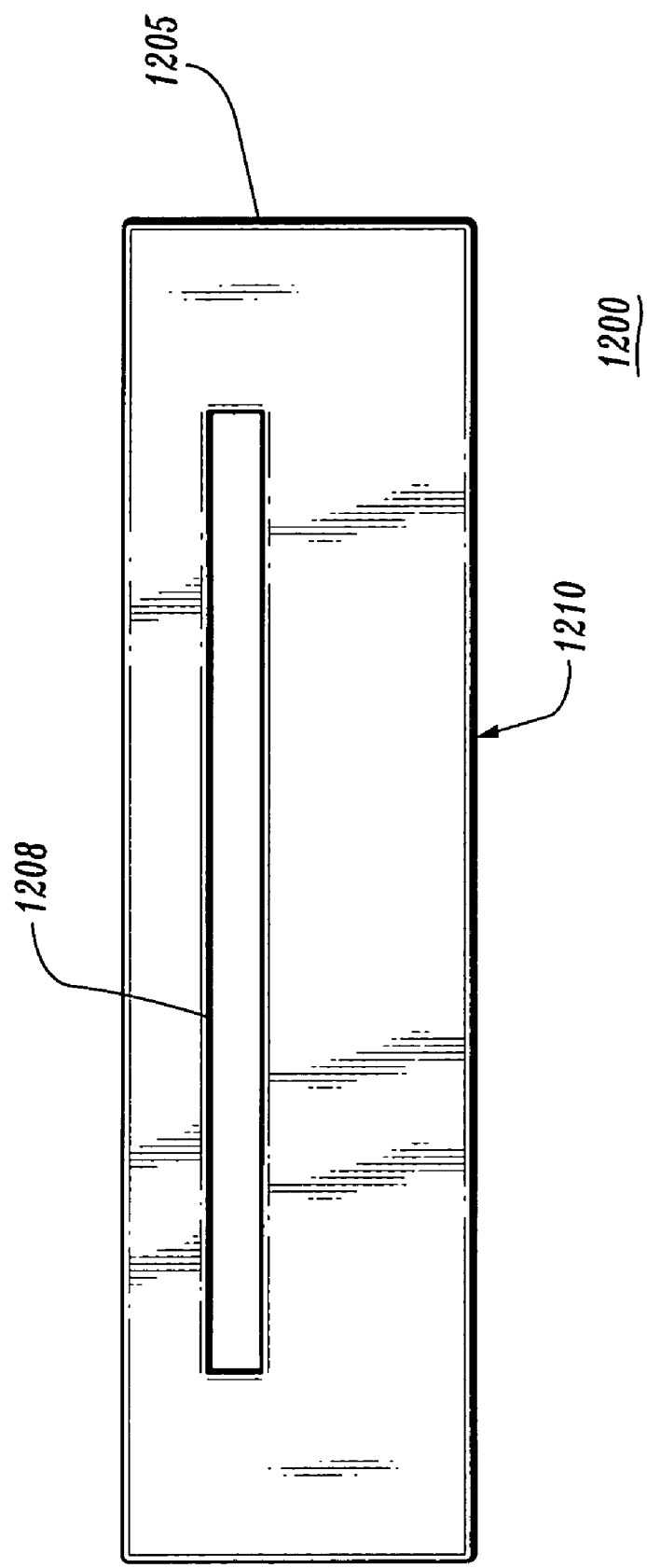

Referring to FIGS. 12A and 12B, in one embodiment of the present invention, a video system 1200 comprises a display 1210 and a media player 1207, wherein the display 1210 is electrically coupled to the media player 1207, and the display 1210 and the media player 1207 are housed together in a housing 1205. The display 1210 displays video data received from the media player 1207. Referring to FIG. 12B, the media player 1207 includes, for example, a slot 1208 for receiving a media storage medium, such as a DVD.

Figure 12C:
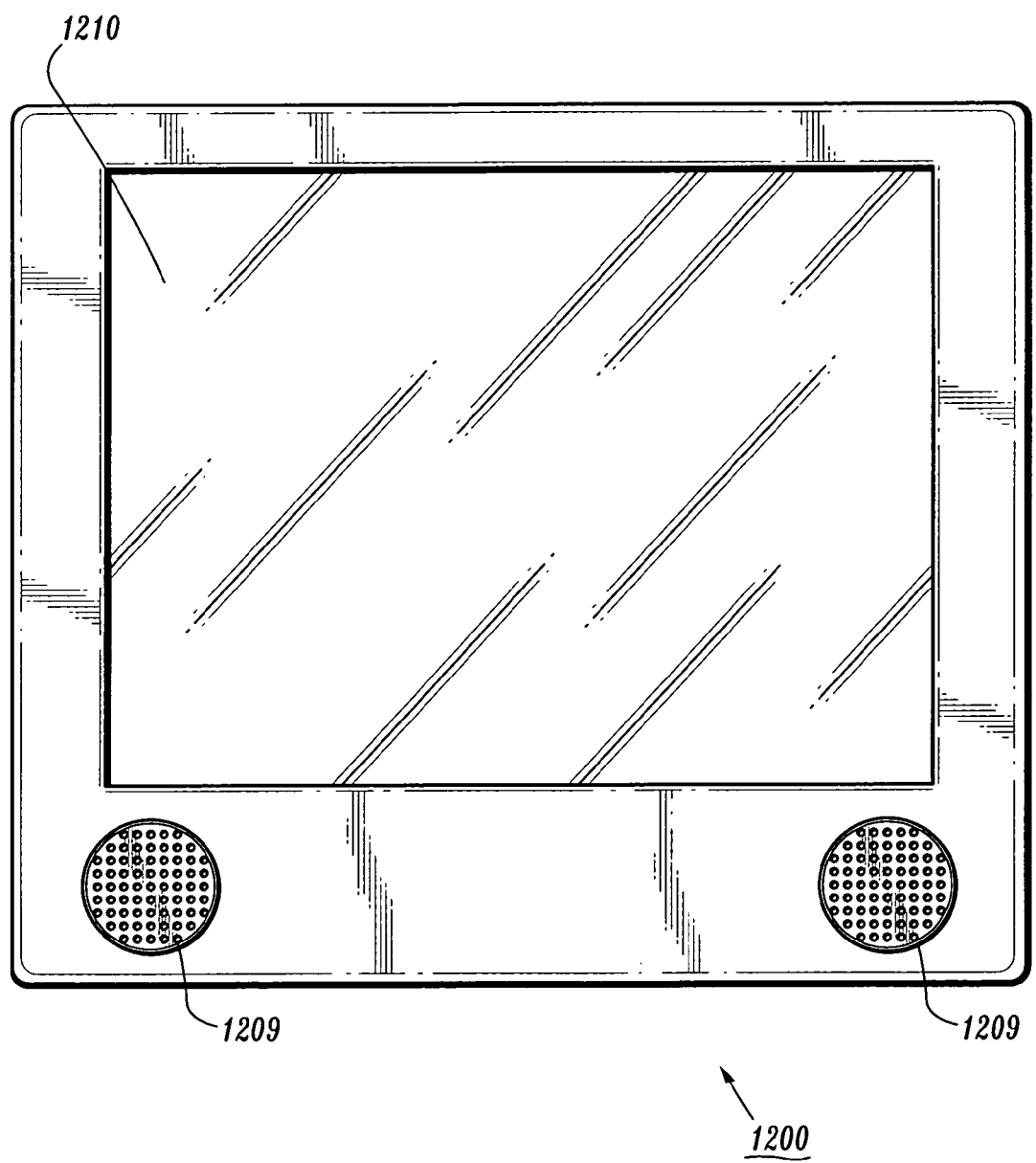

The display 1210 may be one of a cathode ray tube display (CRT), a liquid crystal display (LCD), a gas plasma display, an electro-luminescent display, and a light emitting diode (LED) display. The media player 1207 can be one of a DVD player, a CD-ROM player, a video game player, a videocassette player, a television tuner, a radio tuner, a wireless tuner, a wireless receiver, an MP3 player, a digital video recorder, and a device for playing media supplied from a mass storage device or a combination thereof. The media player 1207 can play media from, for example, a hard drive which previously downloaded and stored media from a source such as a personal computer, personal digital assistant (PDA) or an I-POD®. As shown in FIG. 8, the video system 1200 (801) includes a universal serial bus port, and audio and video input/output ports 802 for transmitting audio/video data. Referring to FIG. 12C, the video system 1200 may also include a speaker 1209.

Figure 7C:
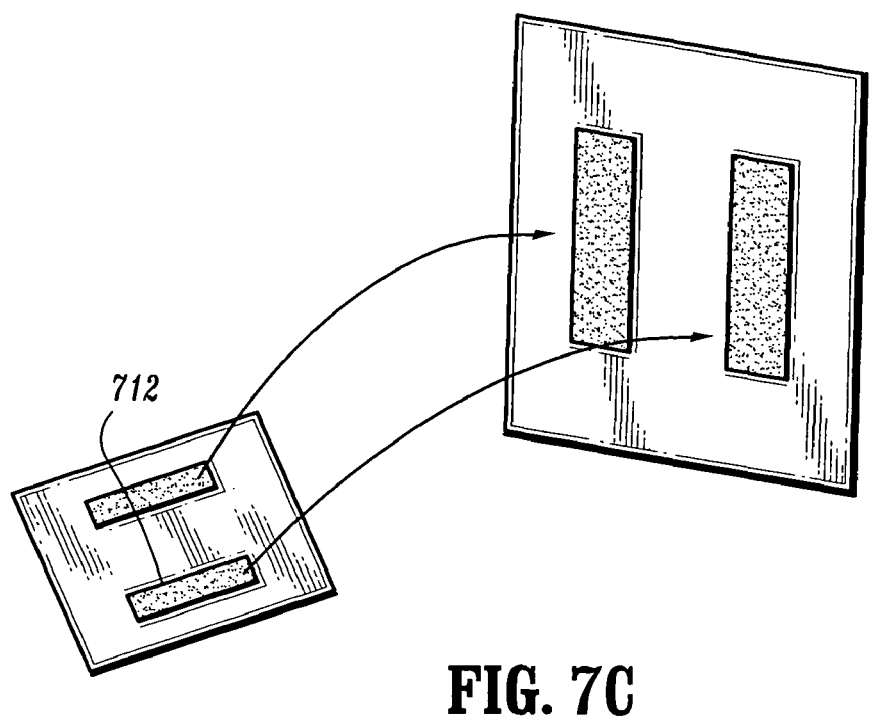
Figure 7D:
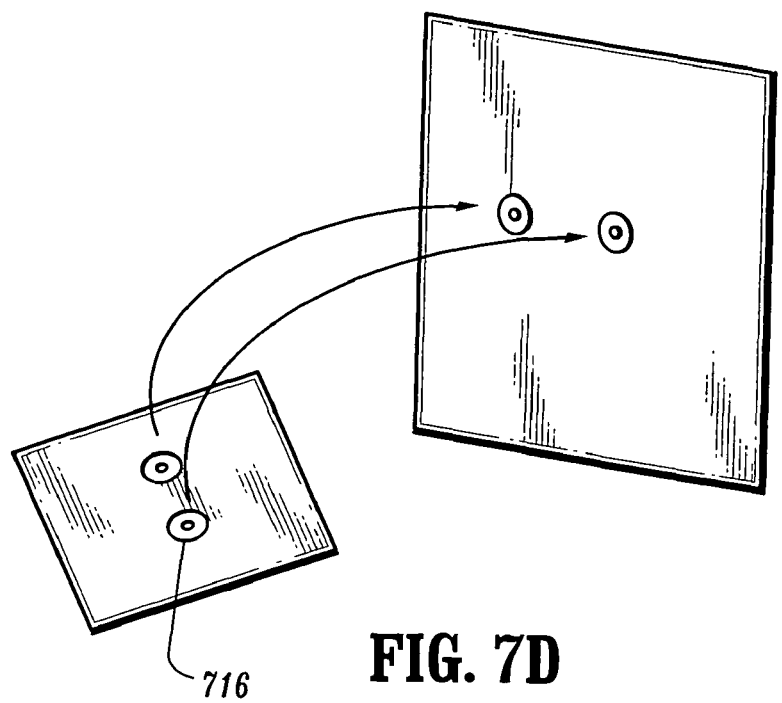
Figure 7E:
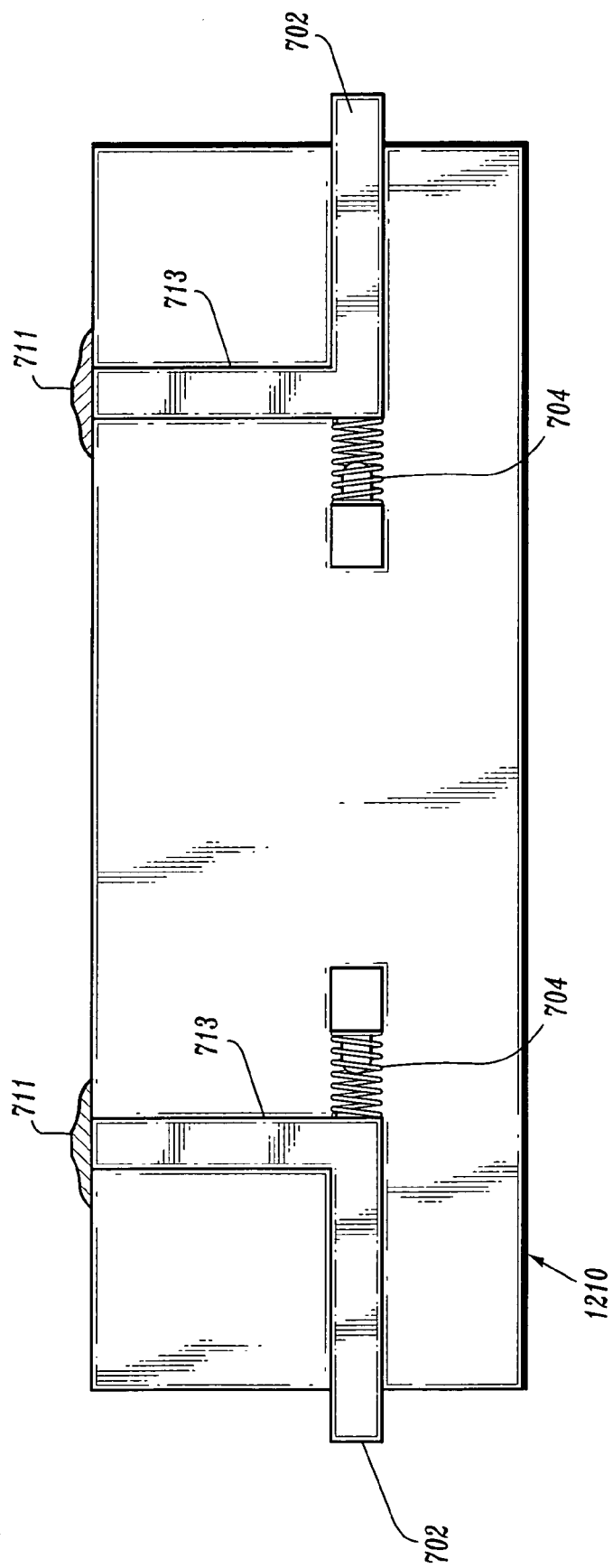
Figure 7F:
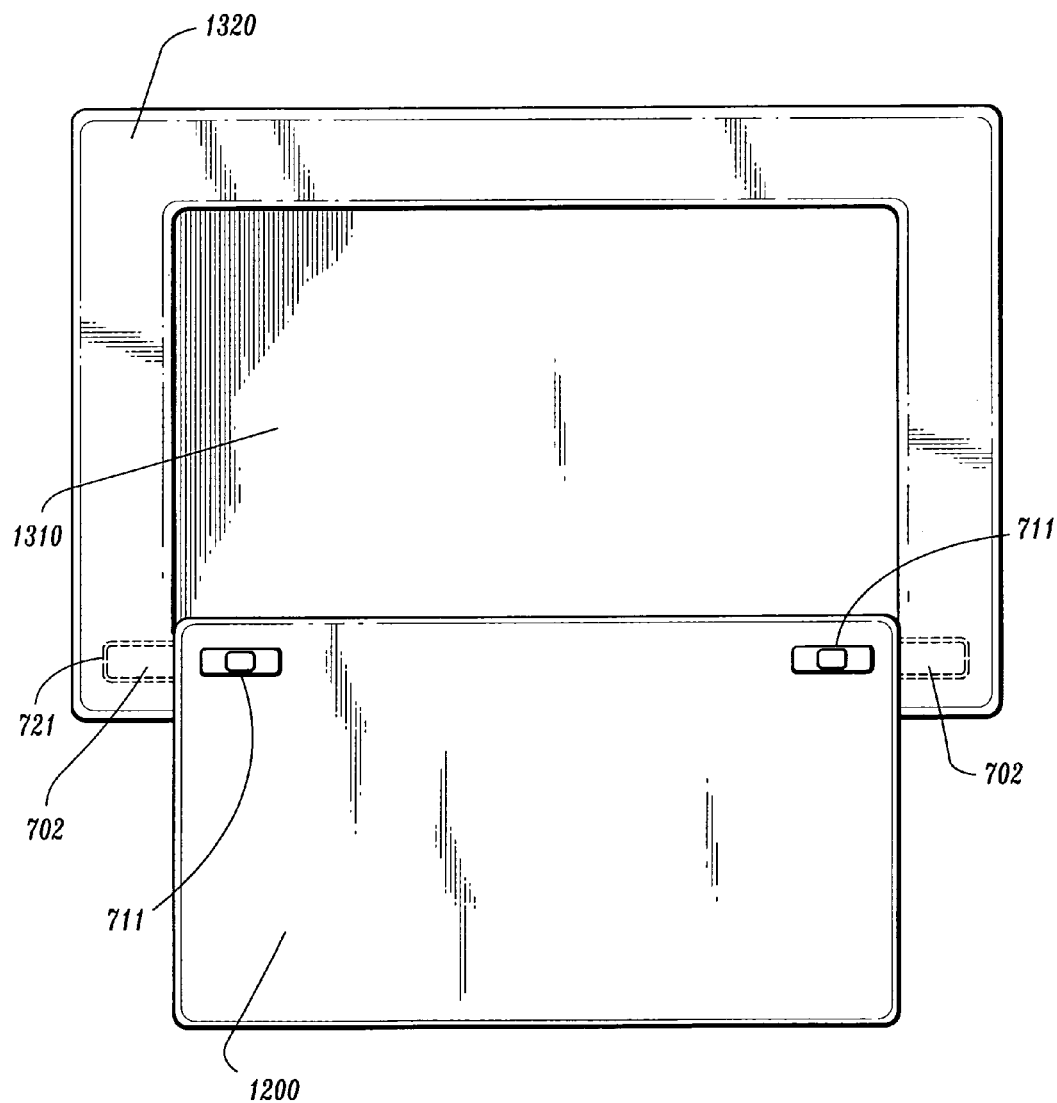
Figure 13A:
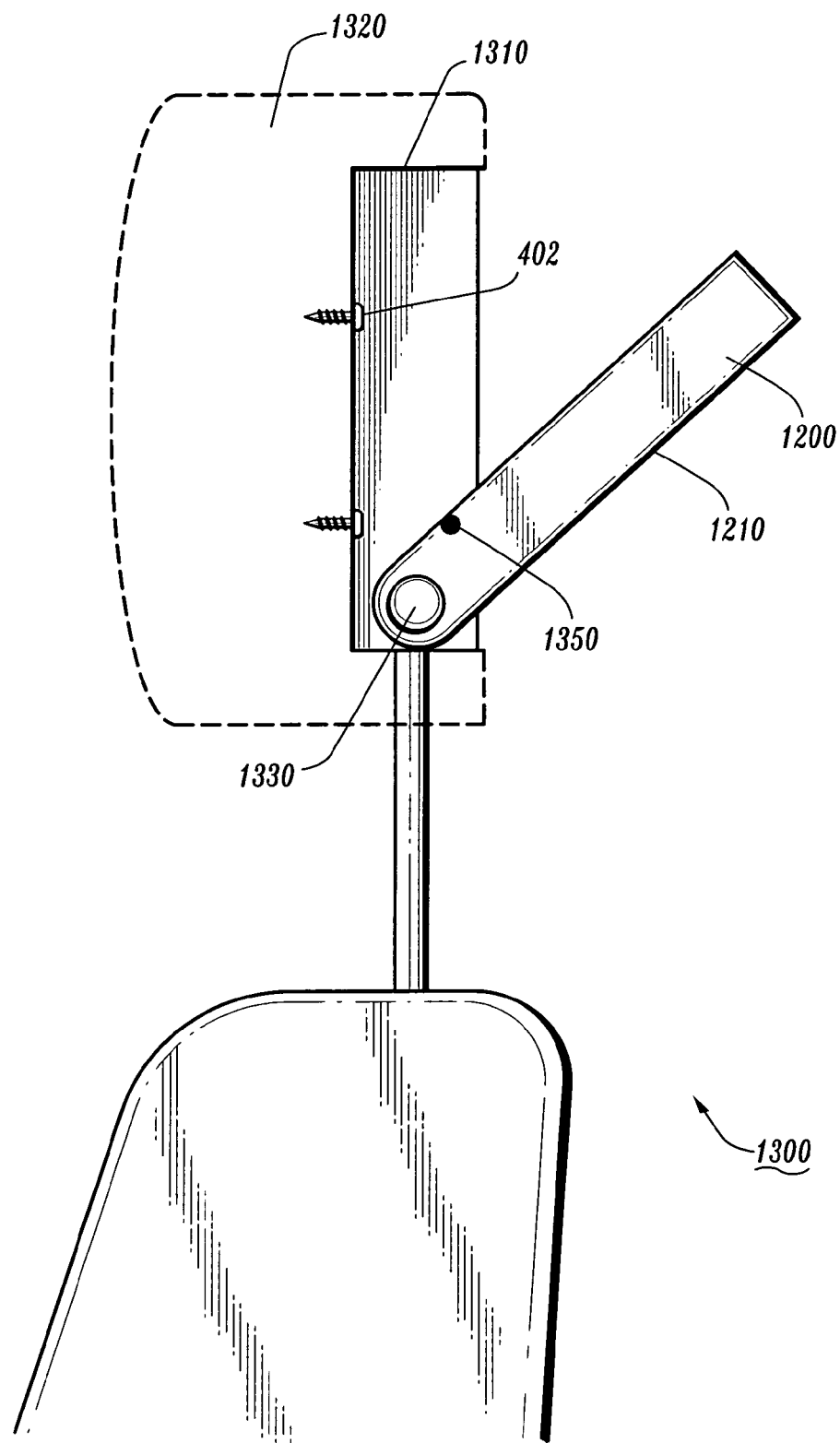
FIGS. 13A and 13B are illustrations of a side view of a video system and docking station according to an embodiment of the present invention.
Figure 13B:
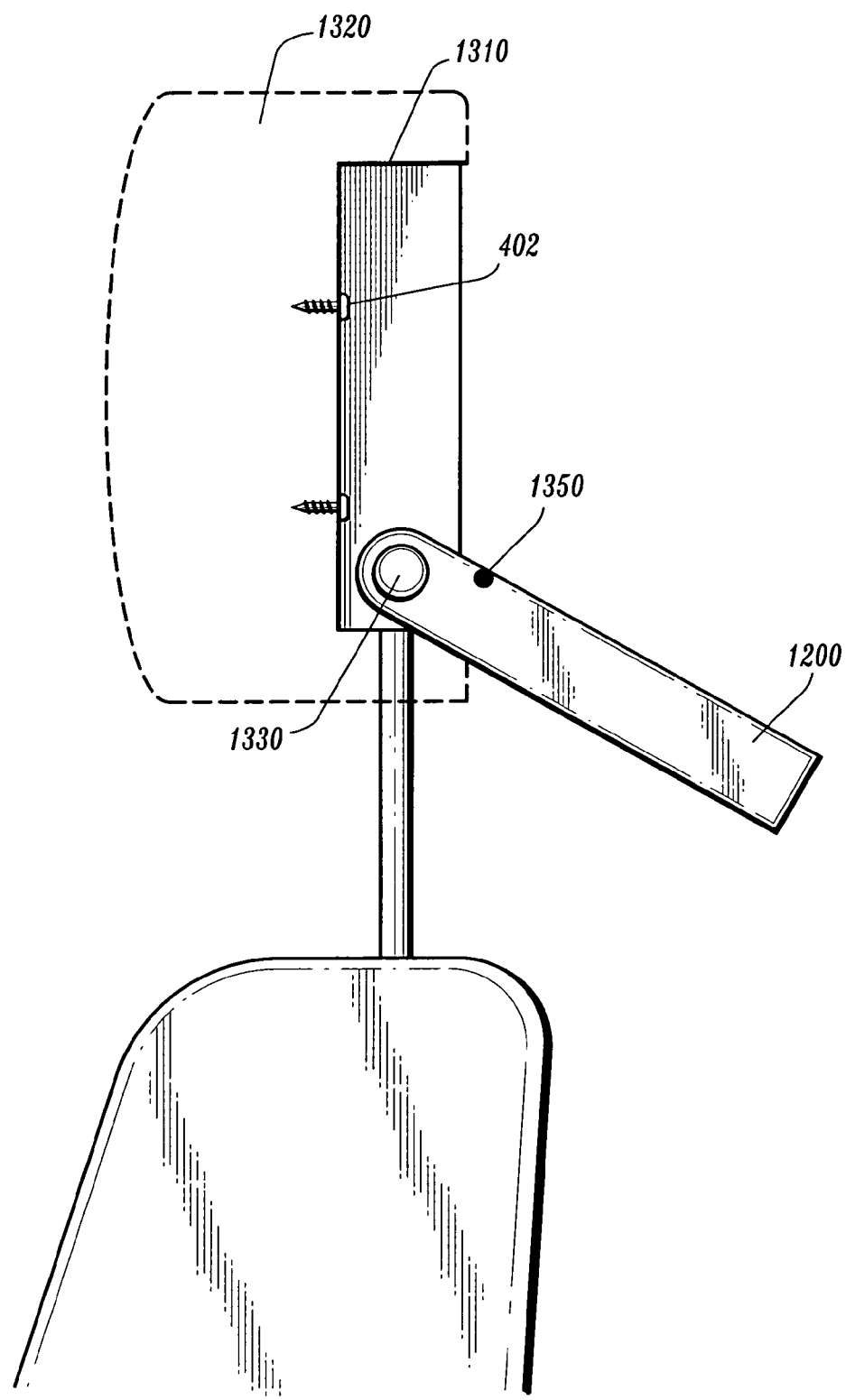

Referring to FIGS. 13A and 13B, a docking station/housing 1310 is disposed substantially inside a headrest 1320 and adapted to secure the video system 1200 including the display 1210 and the media player 1207 therein. The video system 1200 can be selectively detachable from the docking station 1310 using, for example, a quick release mechanism, a flexible coupling mechanism, Velcro or a snap. Referring to FIG. 7A, the quick release mechanism includes a latch 703 that fits into a bottom portion of the video system 1200. Referring to FIGS. 7E and 7F, in one embodiment of the present invention, a latch mechanism includes two latches 713. Each of the latches 713 comprises a bar/button 702 and a spring 704. The bars 702 pass into a left side portion and a right side portion of the video system 1200 to be received in a hole 721 in the docking station 1310. Each of the bars 702 and springs 704 can be the same as the bar and spring shown in FIG. 7A. The two latches 713 having the bars 702 and the springs 704 can also function as hinges such that the bars 702 allow the video system 1200 to rotate. The latch mechanism also includes a locking tab 711 on back of the video system 1200 for moving the latches 713 in and out of the hole 721 in the docking station 1310. Referring to FIG. 7B, the flexible coupling mechanism includes concave and convex portions 707, 706. Referring to FIGS. 7C and 7D, Velcro strips 712 and magnetic or non-magnetic snaps 716 are used to attach the video system 1200 into the docking station 1310.

Referring to FIGS. 4A and 4B, the docking station/housing 1310 can be secured in the headrest 1320 using, for example, screws 402, catches 401, an adhesive, latches, bolts, and molding. The housing 1310 also can be secured to a backrest of a seat.

Referring again to FIG. 12A, the video system 1200 can connect to a specialized battery or battery pack 1225, household batteries 1245 or an AC/DC adapter 1235 for powering the video system 1200 when the video system 1200 is detached from the docking station 1310. Thus, the video system 1200 is capable of being handheld, mounted to the docking station 1310 or mounted to a location in the vehicle away from the docking station 1310. The connection between the video system 1200 and the battery pack 1225 is provided through, for example, pin arrays 1220 and 1221. The connection between the battery pack 1225 and the video system 1200 may be provided through any appropriate electrical contracts, for example contacts for connecting to Lithium or NiCad batteries. The video system 1200 can connect to an AC/DC adapter 1235 via an AC/DC adapter port 1230 located on the video system 1200. Alternatively, a battery housing 1240 inside the video system 1200 can also be used to receive household batteries 1245 or compact battery packs 1225. The position of the pin arrays 1220 and the AC/DC adapter port 1230 on the video system 1200 may vary depending on the number and desired location of the arrays, ports and slots incorporated into the video system 1200. Connectors other than the pin arrays 1220 and the AC/DC adaptor port 1230 known to those skilled in the art may also be used. Referring to FIGS. 6A and 6B, when the video system 1200 is attached to the docking station 1310, power and data can be supplied through pin arrays 601, 602.

Referring to FIGS. 13A and 13B, in one embodiment of the present invention, the video system 1200 can be coupled to the docking station 1310 with a tilt mechanism that allows the video system 1200 to rotate about a horizontal axis between the video system 1200 and the docking station 1310. The tilt mechanism including, for example, a hinge 1330 allows the video system 1200 to rotate in the range of approximately 0° to approximately 180°, preferably about 0° to about 120°; and to lock in different positions at desired viewing angles of the display 1210 of the video system 1200. Alternatively, a hinge mechanism allowing a more limited range of motion, for example, from about 0° to about 90° may be used.

Figure 14:
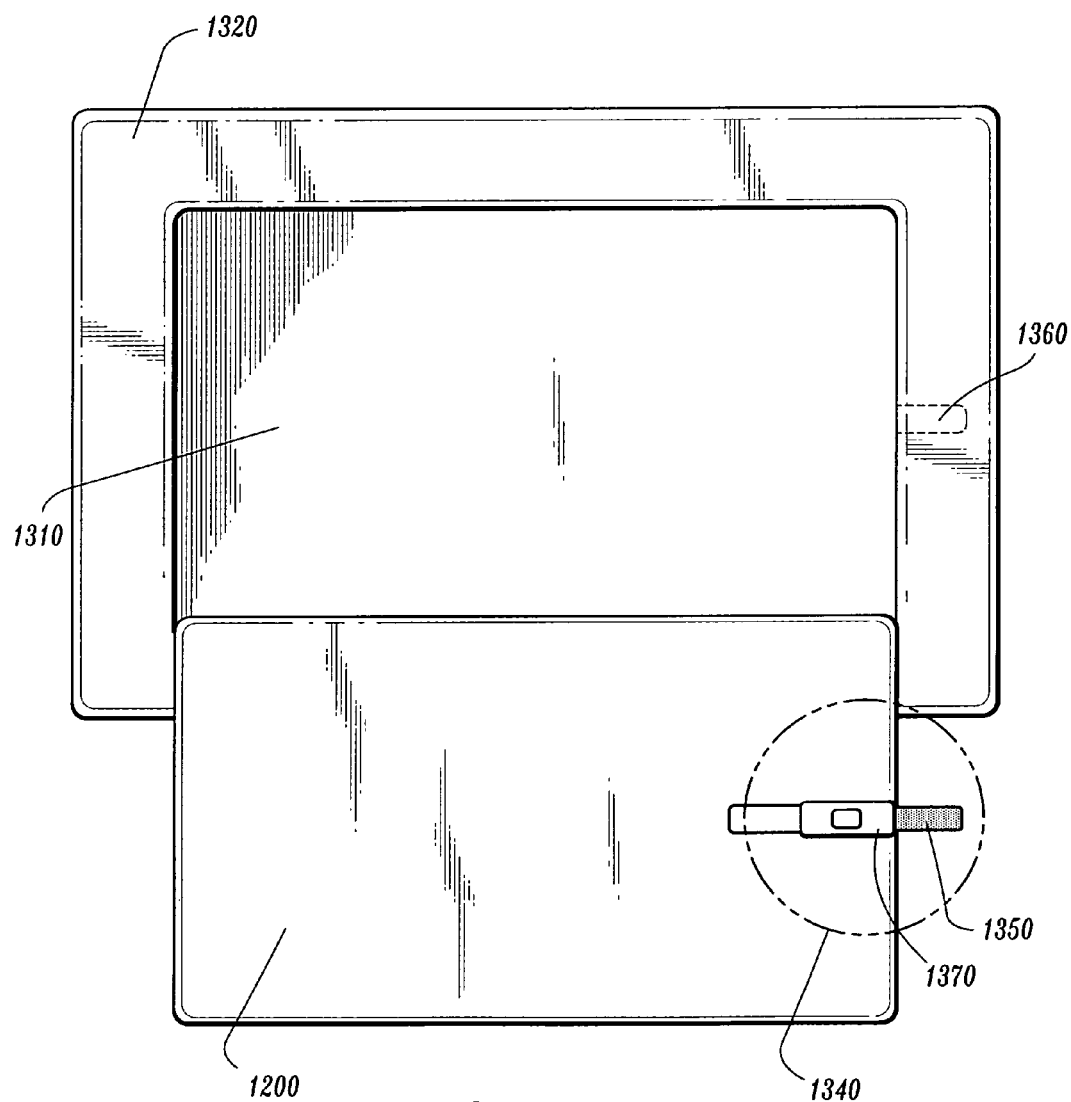
FIGS. 14 and 15 are illustrations of a locking mechanism according to an embodiment of the present invention.
Figure 15:
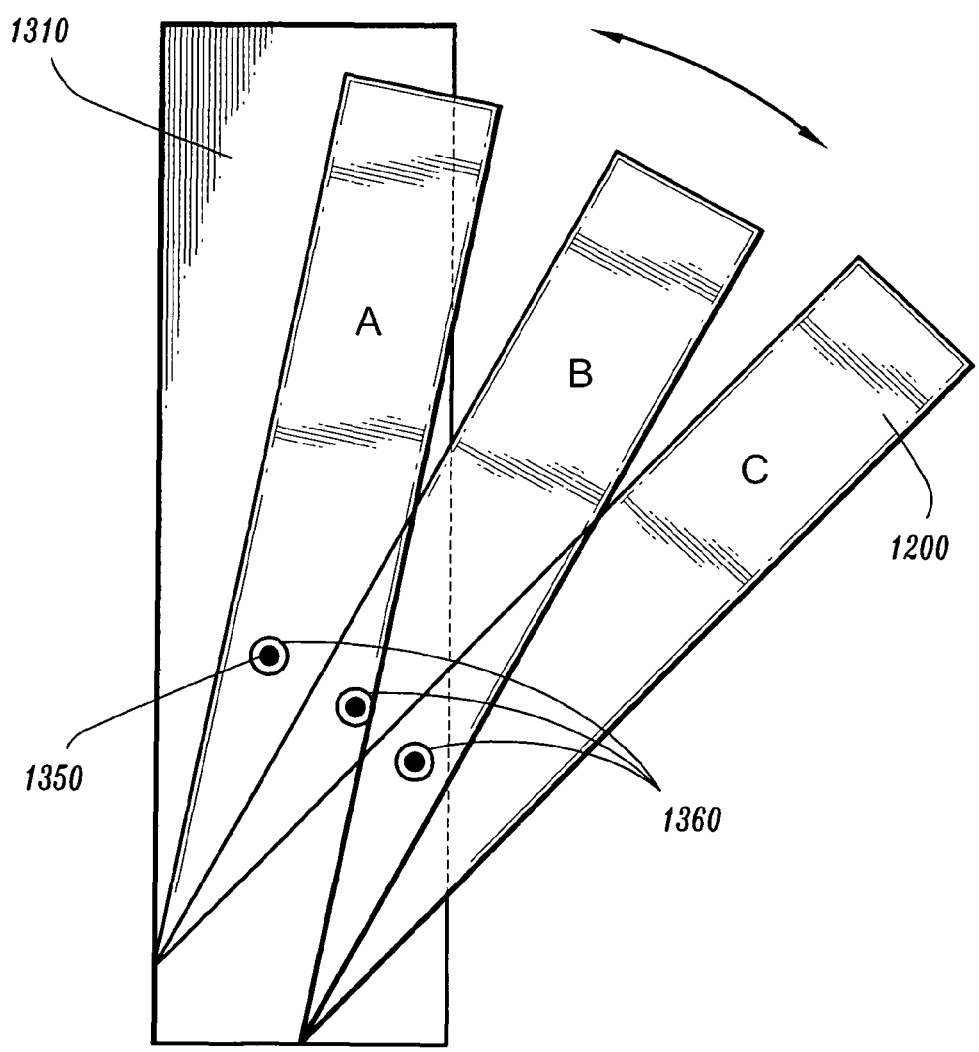

Referring to FIGS. 14 and 15, the video system 1200 may be locked using a fastener 1340 as shown in FIG. 14 such that the video system 1200 does not rotate beyond specified angles such as about 15° (position A in FIG. 15), about 30° (position B) or about 45° (position C). The position of the video system 1200 can be locked when a bar 1350 of the fastener 1340 configured in the video system 1200 is inserted into a hole 1360 formed in the docking station 1310. The hole 1360 for receiving the bar 1350 can be formed in different locations based on the specified angles. In another embodiment of the present invention, the bar 1350 can be configured in the headrest 1320, and the hole 1360 can be configured in the video system 1200.

When the bar 1350 is not inserted into the hole 1360, the video system 1200 can be pivoted, for example, about or over 90° so that a portion of the docking station 1310 can be exposed. Exposing a portion of the docking station 1310 facilitates access to a fixing device which secures the docking station 1310 to the seat, allowing for easy removal of the fixing device. Accordingly, the docking station 1310 having the video system 1200 pivotally rotated can be detached after removing a fixing device such as a screw, a catch, a latch, molding and bolt from the headrest 1320. When the video system 1200 is plugged into a power source, for example, the vehicle power source wired through the vehicle seat, the video system 1200 must be unplugged from the power source before removing the docking station 1310 from the headrest 1320. When not in use, the video system 1200 closes against the docking station 1310 so as to conceal the video system 1200 and occupy less space. The video system 1200 preferably locks in place with a latch mechanism that can be released by depressing a button (not shown).

Having described embodiments for headrest mountable a video system, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A media system for a seat in a vehicle, comprising:
   a display electrically coupled to a media player, wherein the display is housed in a first housing, wherein the first housing includes front, rear, top, bottom, left and right sides, wherein the front side includes a display screen thereon and is joined to the rear side by the top, bottom, left and right sides extending substantially perpendicular from the front side to the rear side so that the rear side opposes and is substantially parallel to the front side; and
   a second housing disposed substantially in the seat and adapted to secure the first housing including the display therein,
   wherein the first housing is pivotable with respect to the second housing, and the first housing includes a fastener having a portion positioned on the rear side of the first housing and a moveable bar, the movable bar positioned in the first housing between the front and rear sides, the moveable bar being moveable into and out of a hole formed in the second housing,
   wherein the moveable bar is moveable in opposing directions substantially perpendicular to the left and right sides of the first housing between a first position protruding from one of the left and right sides into the hole formed in the second housing and a second position out of the hole and within the first housing, the fastener, including the portion positioned on the rear side of the first housing and the moveable bar, being hidden from view when the first housing is in a closed position and the display is in a viewing position.

2. The media system of claim 1, wherein the first housing is selectively detachable from the second housing and further comprises a connector for connecting the first housing to a power source when the first housing is detached from the second housing.

3. The media system of claim 2, wherein the connector includes contacts for connecting a battery pack to the first housing.

4. The media system of claim 2, wherein the connector includes a port for connecting an AC/DC adapter to the first housing.

5. The media system of claim 2, wherein the connector is positioned in a battery housing located in the first housing.

6. The media system of claim 1, wherein the second housing is secured to the seat using at least one of a screw, a catch, an adhesive, a bolt, molding and a latch.

7. The media system of claim 1, wherein the first housing is selectively detachable from the second housing a quick release mechanism.

8. The media system of claim 1, wherein the first housing is selectively detachable from the second housing a latch mechanism.

9. The media system of claim 8, wherein the latch mechanism functions as a hinge for pivoting the first housing against the second housing.

10. The media system of claim 1, wherein the first housing is selectively detachable from the second housing a flexible coupling mechanism including concave and convex portions.

11. The media system of claim 1, wherein the first housing is selectively detachable from the second housing at least one of Velcro and a snap.

12. The media system of claim 1, wherein the first housing includes a speaker.

13. The media system of claim 1, wherein the display displays video data received from the media player.

14. The media system of claim 1, wherein the display is one of a liquid crystal display, a gas plasma display, an electroluminescent display, and a light emitting diode display.

15. The media system of claim 1, wherein the media player is one of a DVD player, a CD-ROM player, a video game player, a videocassette player, a television tuner, a radio tuner, a wireless receiver and tuner, an MP3 player, a digital video recorder, a device for playing media supplied from a mass storage device, and a device programmed for playing media stored on a hard drive.

16. The media system of claim 1, wherein the second housing is mounted in one of a headrest and a main body of the seat.

17. A media system for a seat in a vehicle, comprising:
   a display electrically coupled to a media player, wherein the display is housed in a first housing, wherein the first housing includes front, rear, top, bottom, left and right sides, wherein the front side includes a display screen thereon and is joined to the rear side by the top, bottom, left and right sides extending substantially perpendicular from the front side to the rear side so that the rear side opposes and is substantially parallel to the front side; and a second housing disposed substantially in the seat and adapted to secure the first housing including the display therein, wherein the first housing is pivotally attached to the second housing a tilt mechanism, wherein the first housing is capable of pivoting in an angle range of about 0° to about 90° with respect to the second housing and the first housing includes a fastener having a portion positioned on the rear side of the first housing and a moveable bar, the movable bar positioned in the first housing between the front and rear sides, the moveable bar being moveable into and out of a hole formed in the second housing, wherein the moveable bar is moveable in opposing directions substantially perpendicular to the left and right sides of the first housing between a first position protruding from one of the left and right sides into the hole formed in the second housing and a second position out of the hole and within the first housing, the fastener, including the portion positioned on the rear side of the first housing and the movable bar, being hidden from view when the first housing is in a closed position and the display is in a viewing position.

18. The media system of claim 17, wherein the tilt mechanism includes a hinge configured for pivoting the first housing against the second housing.

19. The media system of claim 17, wherein the moveable bar prevents the first housing from pivoting beyond a predetermined angle.

20. The media system of claim 19, wherein the predetermined angle is an angle in the range of about 15° to about 45°.

21. The media system of claim 19, wherein the moveable bar is moved out of the hole formed in the second housing to allow the first housing to pivot beyond the predetermined angle.

22. The media system of claim 17, wherein the second housing is secured to the seat using at least one of a screw, a catch, an adhesive, a bolt, molding and a latch.

23. The media system of claim 17, wherein the first housing includes a speaker.

24. The media system of claim 17, wherein the display displays video data received from the media player.

25. The media system of claim 17, wherein the display is one of a liquid crystal display, a gas plasma display, an electro-luminescent display, and a light emitting diode display.

26. The media system of claim 17, wherein the media player is one of a DVD player, a CD-ROM player, a video game player, a videocassette player, a television tuner, a radio tuner, a wireless receiver and tuner, an MP3 player, a digital video recorder, a device for playing media supplied from a mass storage device, and a device programmed for playing media stored on a hard drive.

27. A method of removing a media system from a seat of a vehicle, comprising:

pivoting a first housing against a second housing for exposing a portion of the second housing, wherein the first housing is pivotally attached to the second housing and the second housing is attached to the seat, wherein the first housing includes front, rear, top, bottom, left and right sides, wherein the front side includes a display screen thereon and is joined to the rear side by the top, bottom, left and right sides extending substantially perpendicular from the front side to the rear side so that the rear side opposes and is substantially parallel to the front side;

releasing a locking device for enabling pivoting of the first housing beyond a predetermined angle, wherein the locking device comprises a fastener having a portion positioned on the rear side of the first housing and a moveable bar, the movable bar positioned in the first housing between the front and rear sides, the moveable bar being moveable into and out of a hole formed in the second housing, wherein the moveable bar is moveable in opposing directions substantially perpendicular to the left and right sides of the first housing between a first position protruding from one of the left and right sides into the hole formed in the second housing and a second position out of the hole and within the first housing, the fastener, including the portion positioned on the rear side of the first housing and the movable bar, being hidden from view when the first housing is in a closed position and the display is in a viewing position;

removing a fixing device from the exposed portion of the second housing, wherein the fixing device attaches the second housing to the seat; and detaching the second housing, including the first housing pivotally attached thereto, from the seat.

28. The method of claim 27, wherein the first housing includes a display electrically coupled to a media player.

29. The method of claim 27, wherein the second housing is disposed substantially in the seat.

30. The method of claim 27, further comprising unplugging the media system from at least one of a power source and a data source.

31. The method of claim 27, wherein the fixing device includes at least one of a screw, a catch, molding, a latch and a bolt.

* * * * *